United States Patent
Zhang et al.

(10) Patent No.: US 11,330,549 B2
(45) Date of Patent: May 10, 2022

(54) POSITIONING METHOD AND DEVICE FOR USER EQUIPMENT, AND USER EQUIPMENT

(71) Applicant: Samsung Electronics Co., Ltd., Suwon-si (KR)

(72) Inventors: Shichang Zhang, Beijing (CN); Yingyang Li, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/629,809

(22) PCT Filed: Jul. 31, 2018

(86) PCT No.: PCT/KR2018/008720
§ 371 (c)(1),
(2) Date: Jan. 9, 2020

(87) PCT Pub. No.: WO2019/027245
PCT Pub. Date: Feb. 7, 2019

(65) Prior Publication Data
US 2021/0160810 A1    May 27, 2021

(30) Foreign Application Priority Data

Aug. 1, 2017 (CN) .......................... 201710648390.7
Nov. 24, 2017 (CN) .......................... 201711192145.6
Mar. 6, 2018 (CN) .......................... 201810185320.7

(51) Int. Cl.
*H04W 24/00* (2009.01)
*H04W 64/00* (2009.01)

(52) U.S. Cl.
CPC .................................. *H04W 64/00* (2013.01)

(58) Field of Classification Search
CPC .................................................... H04W 64/00
(Continued)

(56) References Cited

U.S. PATENT DOCUMENTS

| 6,070,078 A | 5/2000 | Camp, Jr. et al. |
| 2011/0117925 A1 | 5/2011 | Sampath et al. |

(Continued)

FOREIGN PATENT DOCUMENTS

| CN | 1904638 A | 1/2007 |
| CN | 104010363 A | 8/2014 |

(Continued)

OTHER PUBLICATIONS

Chinese Office Action dated Jan. 12, 2021, issued in a counterpart Chinese Application No. 201810185320.7.

(Continued)

*Primary Examiner* — Tanmay K Shah
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart-city, smart-car, connected car, health care, digital education, smart retail, security and safety services. The present disclosure provides a positioning method and device for user equipment (UE), and UE, the positioning method for UE comprising: detecting, by an auxiliary positioning entity, whether a condition of transmitting positioning related information is currently satisfied; transmitting the positioning related information, if the condition is satisfied, wherein the positioning related information comprises any one of the following: auxiliary positioning information, and location calculation information fed back for positioning request information transmitted by a target UE.

15 Claims, 7 Drawing Sheets

Implementation manner 2
Target UE

(58) Field of Classification Search
USPC .................................................. 455/456.1
See application file for complete search history.

(56) References Cited

U.S. PATENT DOCUMENTS

| | | | |
|---|---|---|---|
| 2011/0136500 A1 | 6/2011 | Sung et al. | |
| 2011/0148699 A1 | 6/2011 | Anderson et al. | |
| 2014/0162544 A1 | 6/2014 | Edge | |
| 2014/0162687 A1 | 6/2014 | Edge | |
| 2015/0018010 A1 | 1/2015 | Fischer | |
| 2015/0199902 A1* | 7/2015 | Hayee .................. | G08G 1/0955 340/907 |
| 2016/0065342 A1 | 3/2016 | Mirbagheri et al. | |
| 2017/0097404 A1 | 4/2017 | Siomina et al. | |
| 2019/0246250 A1 | 8/2019 | Uchiyama | |

FOREIGN PATENT DOCUMENTS

| | | |
|---|---|---|
| CN | 105393612 A | 3/2016 |
| JP | 2017-139658 A | 8/2017 |
| KR | 10-2005-0078163 A | 8/2005 |
| KR | 10-2012-0105530 A | 9/2012 |
| KR | 10-1680123 B1 | 11/2016 |
| WO | 99/19743 A1 | 4/1999 |
| WO | 2015/178830 A1 | 11/2015 |
| WO | 2016/036840 A1 | 3/2016 |
| WO | 2016-148399 A1 | 9/2016 |
| WO | 2017-033486 A1 | 3/2017 |
| WO | 2017-046979 A1 | 3/2017 |

OTHER PUBLICATIONS

Extended European Search Report dated Mar. 15, 2021, issued in a counterpart European Application No. 18840408.1-1231 / 3636018.
3rd Generation Partnership Project; Technical Specification Group Radio Access Network; Study on Indoor Positioning Enhancements for UTRA and LTE; 3GPP TR 37.857 V1.0.1; (Release 13), Sep. 30, 2015.
3GPP TSG RAN meeting #74; RP-162135; Status Report to TSG; Agenda item: 10.4.16; Nov. 8, 2016, Vienna, Austria.
Chinese Office Action dated Aug. 10, 2021, issued in a counterpart Chinese Application No. 201810185320.7.
Chinese Office Action dated Nov. 23, 2021, issued in a counterpart European Application No. 201711192145.6.
A Decision to Grant a Patent dated Dec. 31, 2021, issued in a counterpart Korean Application No. 10-2020-7003068.

* cited by examiner

[Fig. 1]
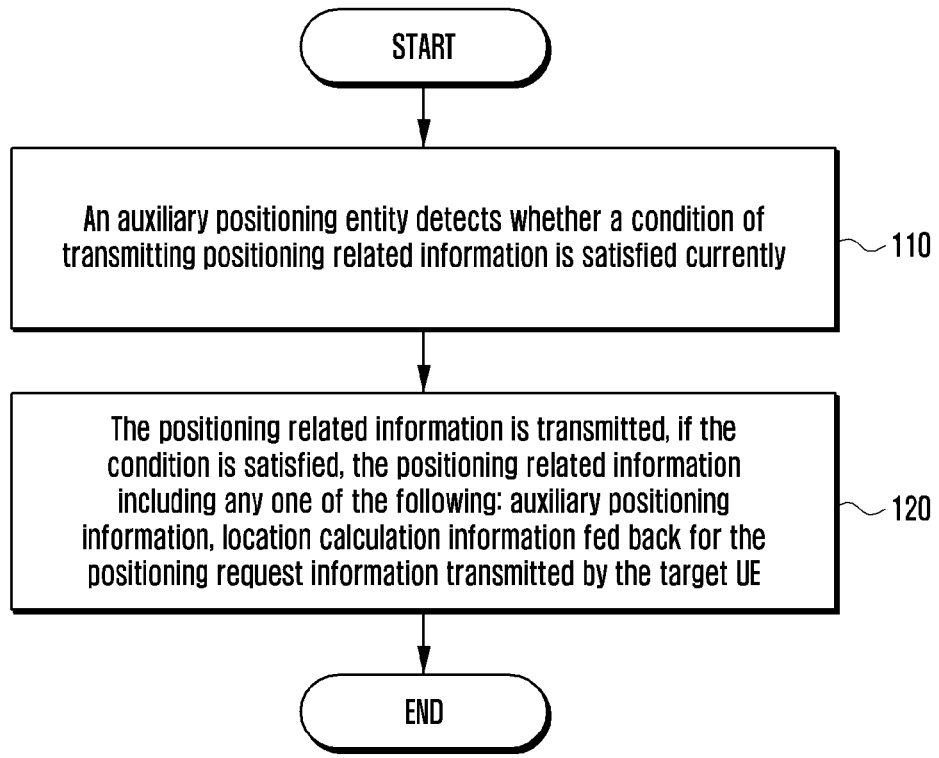
[Fig. 2]
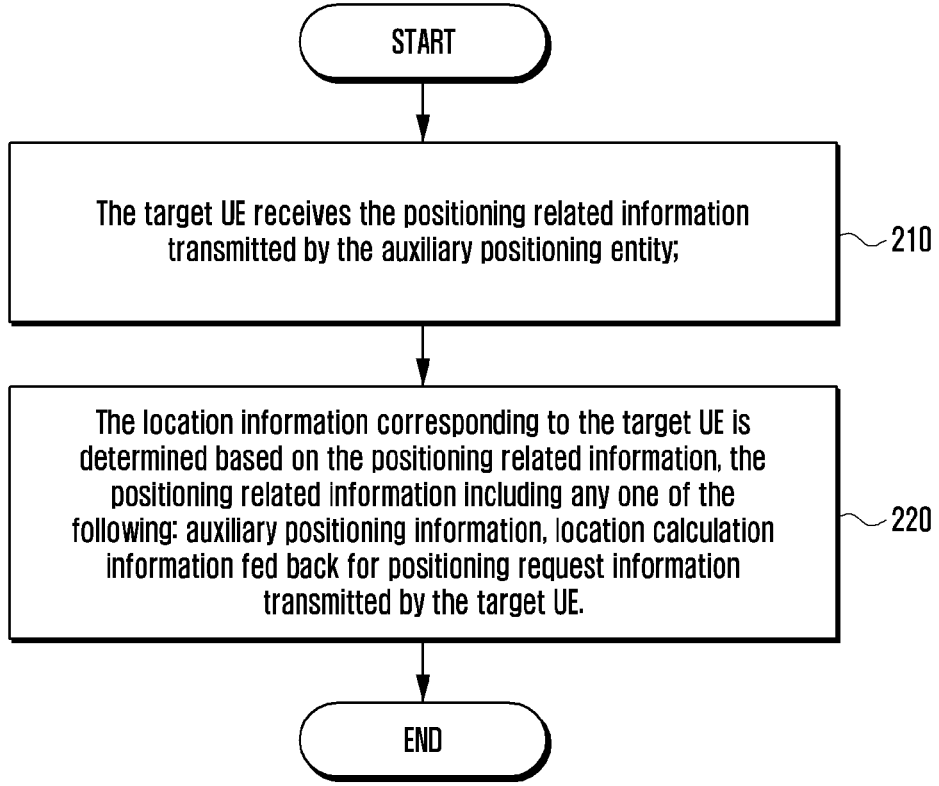

[Fig. 3]
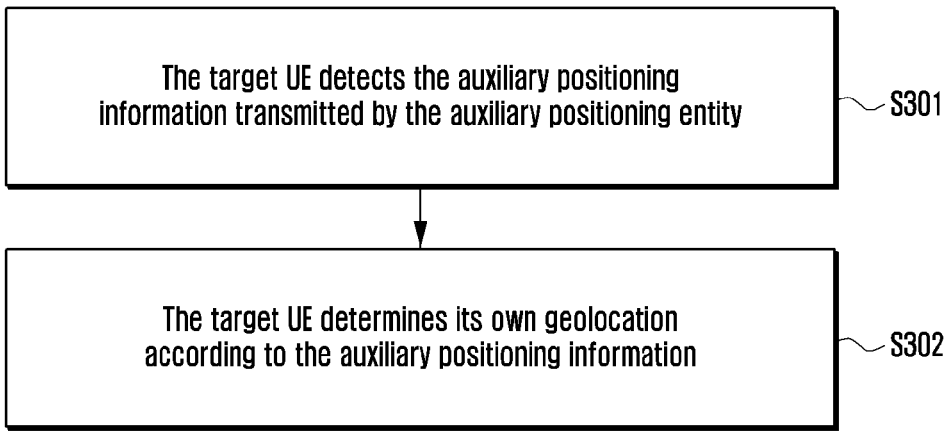
[Fig. 4]
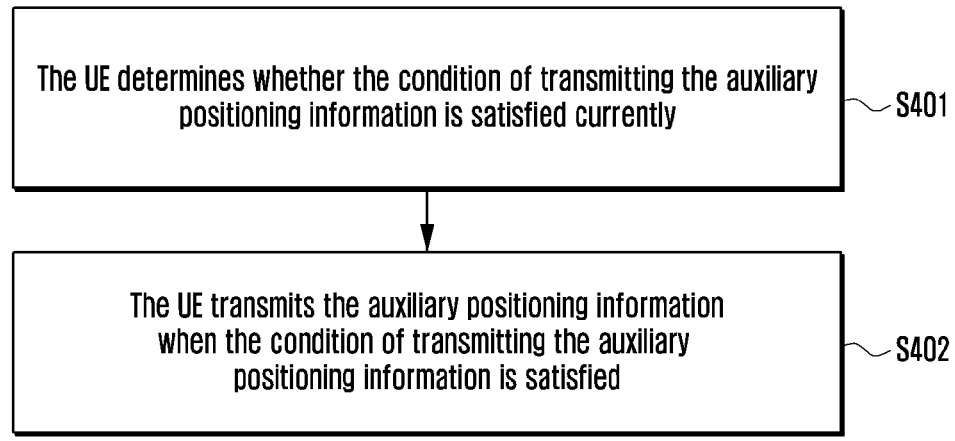
[Fig. 5]
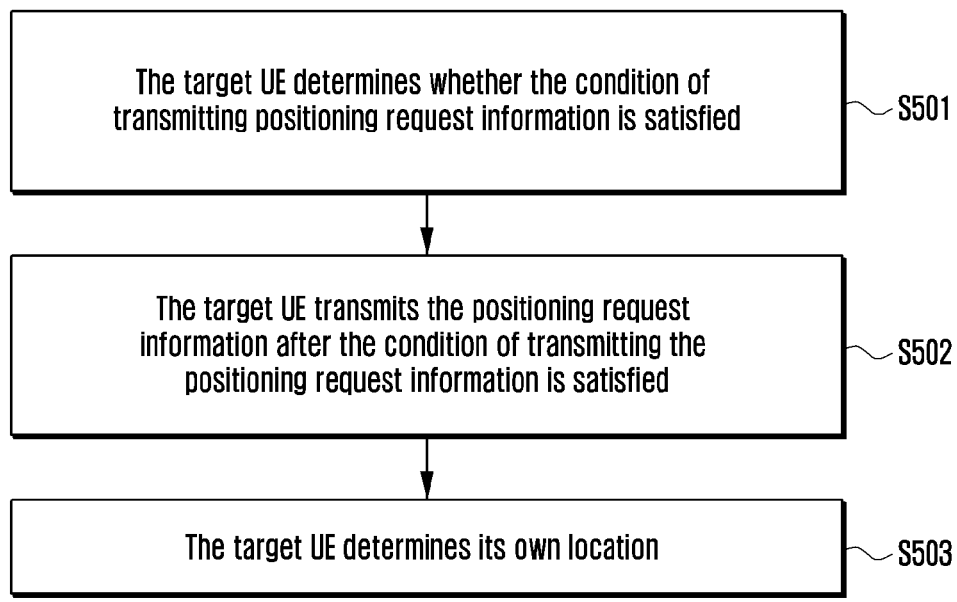

[Fig. 6]
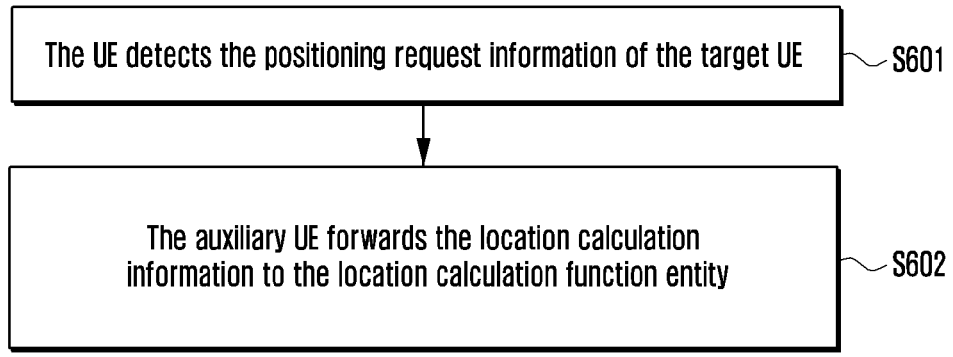
[Fig. 7]
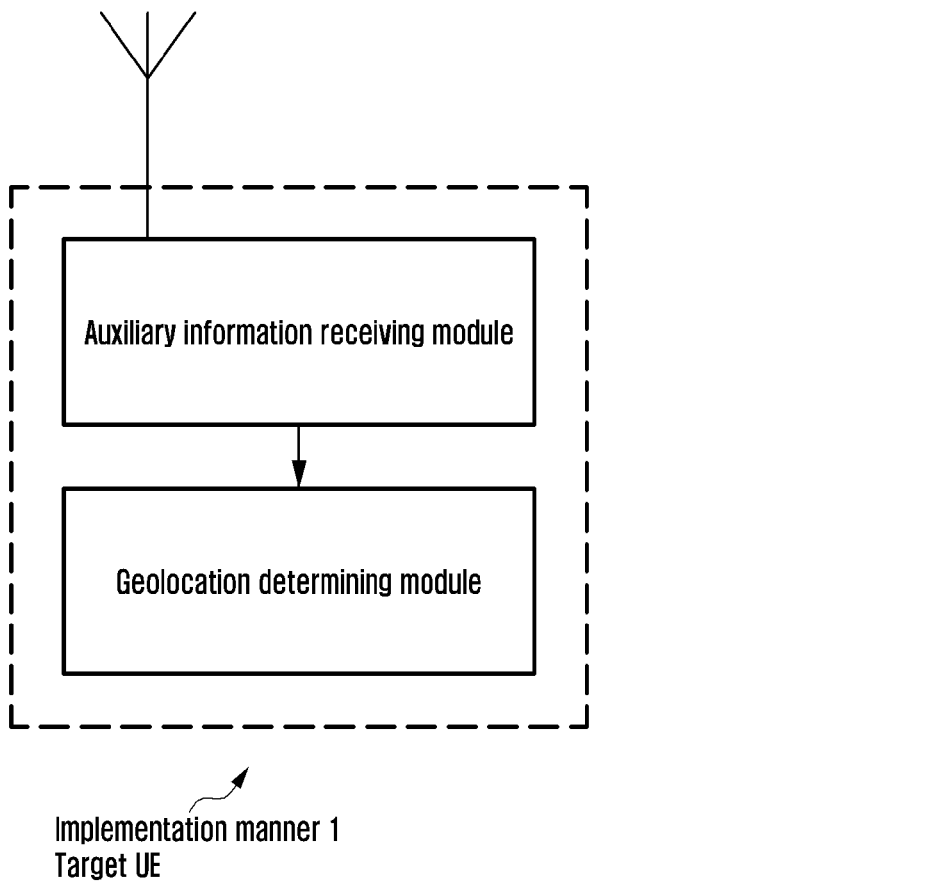
Implementation manner 1
Target UE

[Fig. 8]
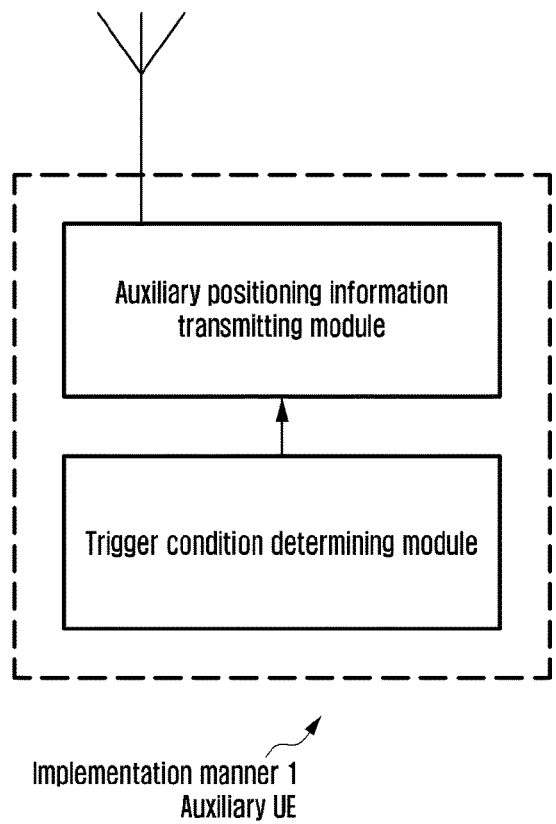
Implementation manner 1
Auxiliary UE
[Fig. 9]
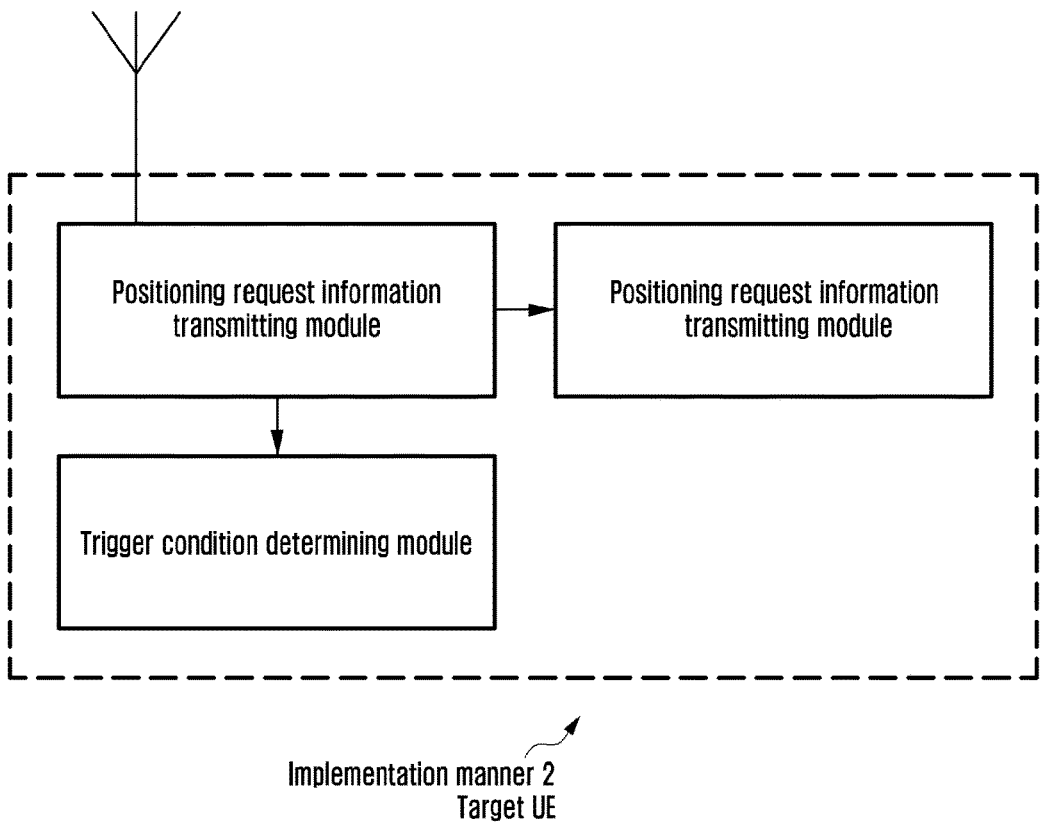
Implementation manner 2
Target UE

[Fig. 10]
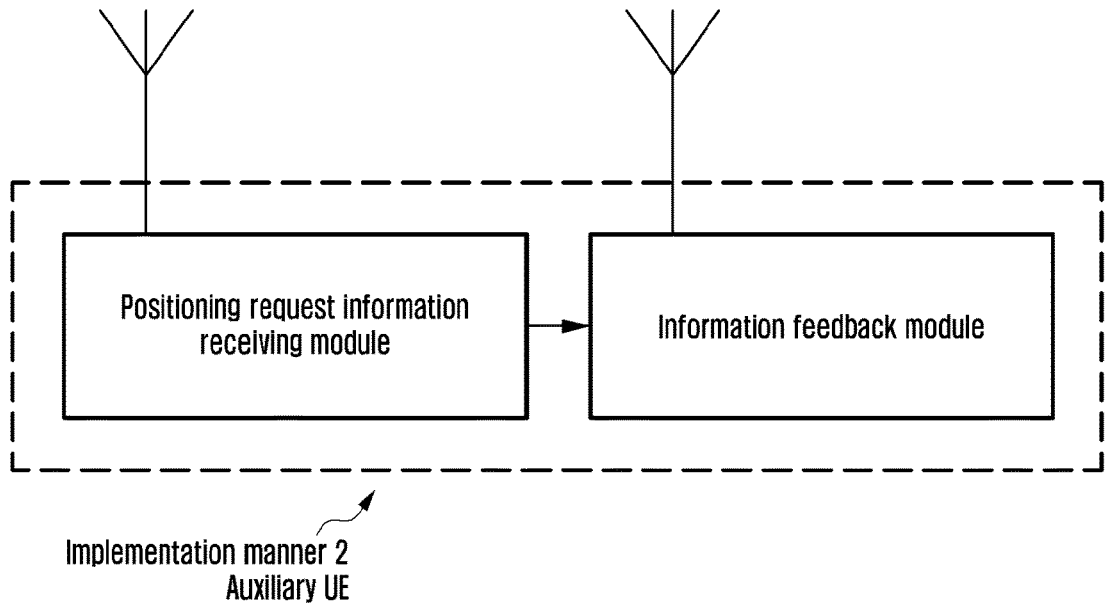
Implementation manner 2
Auxiliary UE
[Fig. 11]
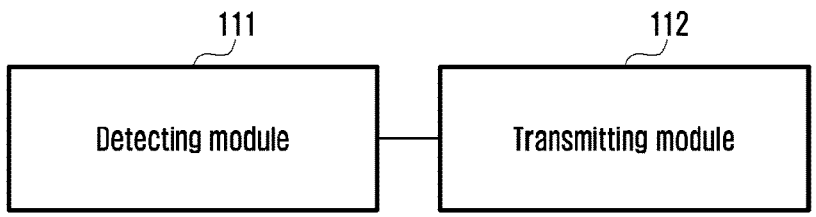
[Fig. 12]
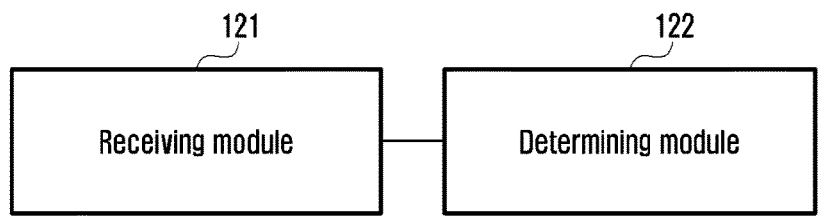
[Fig. 13]
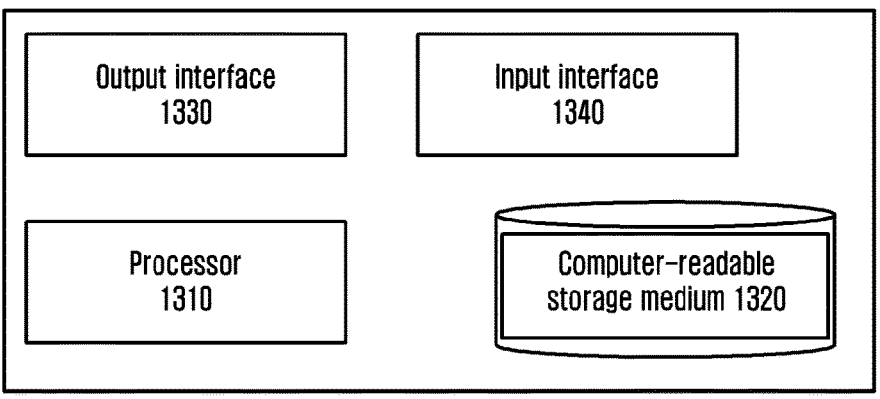

[Fig. 14]
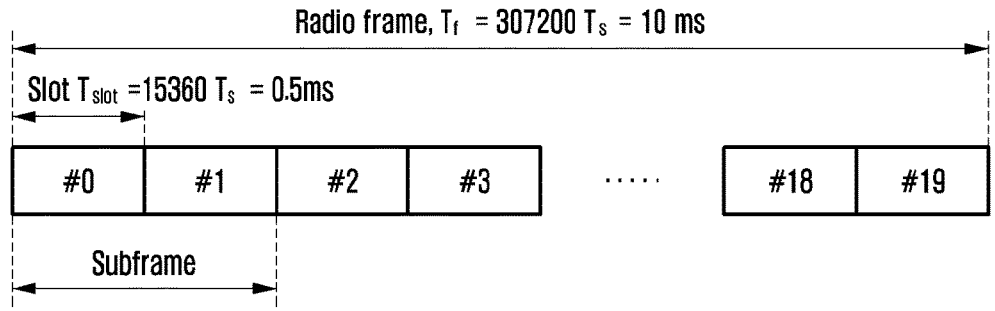
[Fig. 15]
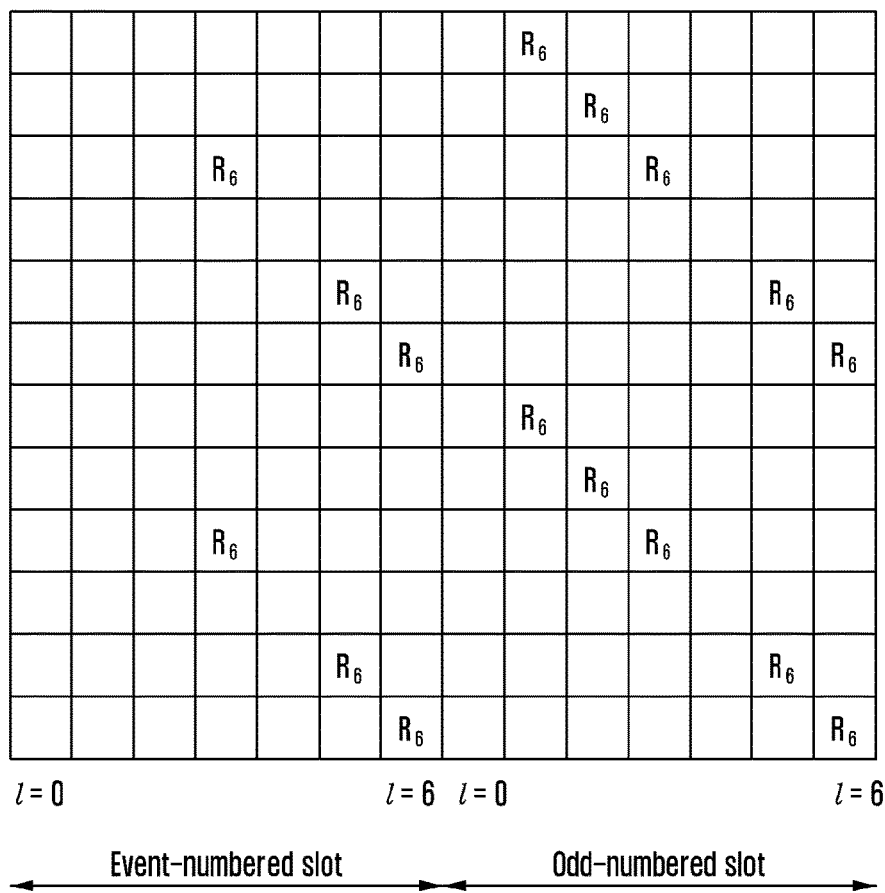
[Fig. 16]
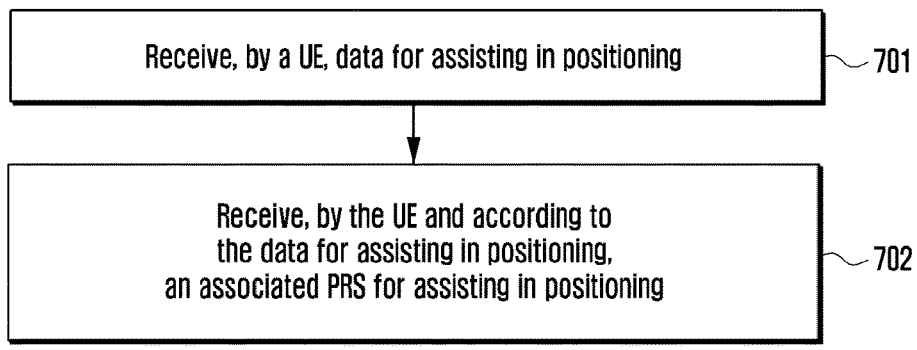

[Fig. 17]
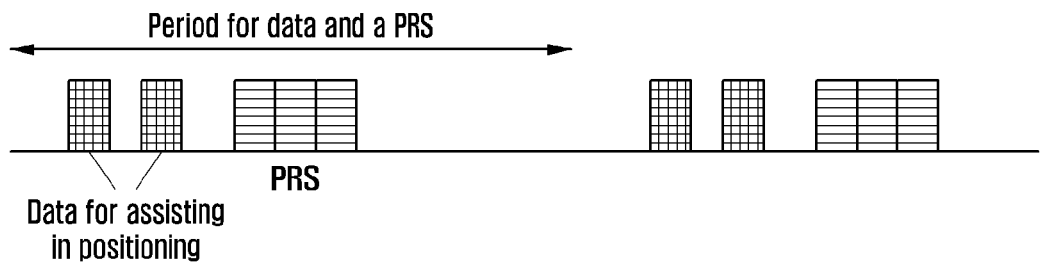
[Fig. 18]
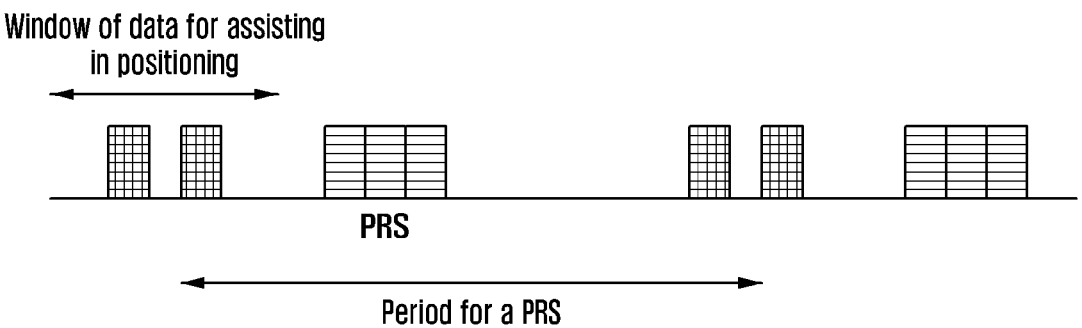
[Fig. 19]
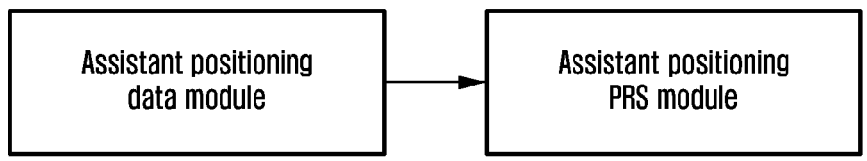

POSITIONING METHOD AND DEVICE FOR USER EQUIPMENT, AND USER EQUIPMENT

TECHNICAL FIELD

The present disclosure relates to the technical field of mobile communication, and in particular to a positioning method and device for user equipment (UE), and the UE, a method and an equipment for allocating positioning resources when a V2X system supports the positioning operation.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "wired/wireless communication and network infrastructure" "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the 3GPP standard, the direct communication link between UEs is called a sidelink Similar to the uplink and downlink, the sidelink also has a control channel and a data channel, of which the former is called a Physical Sidelink Control Channel (abbreviated as PSCCH), and the latter is called a Physical Sidelink Shared Channel (abbreviated as PSSCH). The PSCCH is used to indicate the time-frequency resource position, modulation coding scheme of the PSSCH transmission, and the priority of data carried in the PSSCH. The PSSCH is used to carry data.

A PSCCH resource pool and a PSSCH resource pool occupy a same set of subframes. The PSCCH may be located in the same subframe as one of its scheduled PSSCHs. One PSCCH is fixedly mapped to two PRBs. The allocation granularity of a frequency resource is a sub-channel, and one sub-channel contains consecutive Physical Resource Blocks (PRBs). The number of PRBs is configured by higher-layer signaling. The resources of one device may occupy one or more consecutive subchannels. PSCCH and PSSCH may occupy continuous PRBs. The lowest-frequency PRBs among one or more consecutive sub-channels occupied by the resources of one device occupy are used for carrying the PSCCH, and the other PRBs are used for carrying the PSSCH. The PRBs of the PSCCH and the PRBs of the PSSCH may also be inconsecutive. In this case, the starting PRB positions of the PSCCH resource pool and the PSSCH resource pool may be configured respectively. The PSSCH resource pool still allocates resources with a granularity of sub-channel. For a device, the index of the occupied PSCCH is equal to the smallest sub-channel index of the occupied PSSCH.

The LTE system supports the positioning for UE. To support positioning, the LTE system introduces a reference signal (PRS) for positioning. The PRS may be transmitted by a base station or other network entities, and the UE may determine the location of the UE based on the time difference by measuring the PRS, for example, measuring the time difference of the PRSs between two base stations. In the positioning system, the division according to functions may include: an auxiliary positioning entity, a measurement function entity, and a location calculation function entity. The auxiliary positioning entity transmits the data for auxiliary positioning and the signal for auxiliary positioning. For example, the above-mentioned data for auxiliary positioning may include location information of the auxiliary positioning entity, time difference related information, and configuration information of the signal for auxiliary positioning, etc.; the above-mentioned signal for auxiliary positioning may refer to a reference signal dedicated to a positioning operation, or refer to other reference signals in the system, such other reference signals may be used for positioning, the signal for auxiliary positioning is collectively referred to as Positioning Reference Signal (PRS) below. The geo-location information of the auxiliary positioning entity may be known, measured or unknown. The measurement function entity receives data from the auxiliary positioning entity for auxiliary positioning and accordingly measures the associated PRS for auxiliary positioning to acquire the measurement amount for positioning. The location calculation function entity is configured to calculate the location of the target device based on the data provided by the auxiliary positioning entity in combination with the measurement result of the measurement function entity. In an LTE positioning system, the auxiliary positioning entity is an eNB, the measurement function entity is usually a UE, and the location calculation function entity is usually a positioning server. Therefore, in the LTE positioning system frame, the UE needs to be located within the coverage of the LTE network to use the LTE positioning mechanism to achieve positioning.

The 3GPP standards organization is standardizing new access network technology (NR). Correspondingly, the performance of V2X (Vehicle-To-Everything) may be further enhanced in the NR system. One direction that needs to be enhanced is the positioning function for the UE. UEs participating in V2X communication in a V2X communication scenario may not always be able to detect the auxiliary positioning information transmitted by the base station, for example, when the UE is outside the coverage of the cellular network. In addition, when the UE is in a dense urban area, a tunnel, or an underground parking, the UE cannot detect the reliable GNSS signal of the global navigation satellite system, so it cannot be positioned by the GNSS. Therefore, how to ensure that UE may acquire location information timely and accurately in V2X communication is an urgent problem to be solved.

In another aspect, in a Long Term Evolution (LTE) system of the 3GPP standardization organization, as shown in FIG. 14, the length of each radio frame is 10 ms and each radio frame is equally divided into 10 subframes. Each downlink subframe includes two slots, and for a normal CP length, each slot contains 7 OFDM symbols. The granularity for resource allocation is a Physical Resource Block (PRB), and one PRB contains 12 consecutive subcarriers in the frequency domain and corresponds to one slot in the time domain. Resource Element (RE) is the smallest unit of time-frequency resources. In other words, each RE is a subcarrier in the frequency domain, and is an OFDM symbol in the time domain.

The LTE system supports the positioning for a User Equipment (UE). In order to support the positioning, the LTE system has introduced a Positioning Reference Signal (PRS). A PRS can be transmitted by a base station or other network entities. A UE can determine the position of the UE based on time difference by measuring the PRS, for example, by measuring time difference between PRSs from two base stations. The PRS is allocated according to the period $T_{PRS}$, and $N_{PRS}$ consecutive subframes starting from the subframe offset $\Delta_{PRS}$ are occupied within one period. The $N_{PRS}$ consecutive subframes are called one PRS position. That is, the first subframe in each period satisfies $(10 \times n_f + \lfloor n_s/2 \rfloor - \Delta_{PRS}) \bmod T_{PRS} = 0$, wherein $n_f$ is the frame number and $n_s$ is the slot number. Within one subframe, a PRS is defined on an OFDM symbol which is not used for transmitting a Common Reference Signal (CRS) and a downlink control channel. FIG. 15 is a pattern of a PRS within one PRB of one subframe, wherein the RE marked by R6 is the RE for a PRS. Within one OFDM symbol, the subcarrier spacing for a PRS is 6 and thus six orthogonal PRS patterns are supported based on 6 frequency offsets. In addition, the LTE system also supports to configure a muting pattern for a PRS. The muting pattern for the PRS is configured by a bitmap with a length of $T_{REP}$, wherein each bit accordingly indicates whether a PRS is transmitted in one PRS position. By using different frequency offsets and muting patterns, the mutual interference of PRSs transmitted by entities is reduced.

The LTE system also supports V2X (Vehicle to Vehicle/Pedestrian/Infrastructure/Network) communication. In a V2X system, a UE transmits a scheduling Assignment (SA) indicative of information such as time-frequency resources occupied by a data channel and the Modulation and Coding Scheme (MCS); and the UE transmits data on the data channel scheduled by the SA. For an LTE D2D/V2X system, the SA is also called a Physical Sidelink Control Channel (PSCCH) and the data channel is also called a Physical Sidelink Shared Channel (PSSCH). A set of PSCCH resources is called a PSCCH resource pool and a set of PSSCH resources is called a PSSCH resource pool.

On one carrier of the V2X system, subframes occupied by V2X synchronous channels are removed and some reserved subframes are removed so that the number of remaining subframes within one System Frame Number (SFN) is an integral multiple of a bitmap length $L_{bitmap}$ of the configured resource pool. In a Time Division Duplexing (TDD) system, it is necessary to remove all downlink subframes. A set of remaining subframes is donated by $(t_0^{SL}, t_1^{SL}, \ldots, t_{T_{max}}^{SL})$, $0 \le t_i^{SL} < 10240$, $0 \le i \le T_{max}$ is the logical number of a remaining subframe. In the set $(t_0^{SL}, t_1^{SL}, \ldots, t_{T_{max}}^{SL})$, resource pool is defined by the bitmap $(b_0, b_1, \ldots, b_{L_{bitmap}-1})$ with a length of $L_{bitmap}$. When $b_{k'}=1$ and $k'=k \bmod L_{bitmap}$, a subframe $t_k^{SL}$ belongs to the resource pool. Therefore, a V2X resource pool is defined on the basis of logical subframes.

The PSCCH resource pool and the PSSCH resource pool occupy a same subframe set. A PSCCH and one PSSCH scheduled by the PSCCH can be located on a same subframe. One PSCCH is fixedly mapped onto two PRBs. The allocation granularity for frequency resources is a sub-channel, and one sub-channel contains consecutive PRBs, wherein the number of PRBs is configured by a higher-layer signaling. Resources for one equipment can occupy one or more consecutive sub-channels. The PSCCH and the PSSCH can occupy consecutive PRBs. In one or more consecutive sub-channels occupied by the resources for one equipment, two PRBs having the lowest frequency are used for carrying the PSCCH, and other PRBs are used for carrying the PSSCH. The PRBs for the PSCCH and the PRBs for the PSSCH may inconsecutive. In this case, a starting PRB of the PSCCH resource pool and a starting PRB of the PSSCH resource pool can be configured, respectively. The PSSCH resource pool still allocates resources by using a sub-channel as the granularity. For one equipment, an index of the occupied PSCCH is equal to a minimum sub-channel index of the occupied PSSCH.

For data transmission of a UE, each data can be repeatedly transmitted for K times and correspondingly, K resources need to be reserved, where K is greater than or equal to 1. In this way, it is avoided that this data cannot be received by some equipments due to the limitation of the half-duplex operation. The UE can periodically reserve the K resources according to a certain reservation interval, and thus can transmit multiple data. According to the sensing information within one sensing window, the UE can select the K resources that can be occupied by the UE and consecutively reserve the K resources for C periods. One resource sensing method is to obtain, on the basis of decoding PSCCHs of other UEs, PSSCHs scheduled by the PSCCHs. In this way, the received power PSSCH-RSRP of a corresponding UE can be measured. Thus, the resource occupancy and/or reservation is decided on the basis of the received power and the reservation interval in the PSCCHs. Another resource sensing method is to decide the resource occupancy and/or reservation on the basis of the received energy S-RSSI. Comprehensively considering the two methods, the equipment can avoid occupying the same resources as other equipments for transmission as far as possible.

DISCLOSURE OF INVENTION

Technical Problem

The New Radio (NR) access network technique is under standardization by the 3GPP standardization organization. Accordingly, the performance of V2X can be further enhanced in the NR system. One aspect to be enhanced is the positioning function for a UE. In a V2X scenario, when the position of one UE is determined, the UE can assist in positioning of other UEs. The UE which provides the function of assisting in positioning can include vehicles, pedestrians, Road-Side Units (RSUs), etc. The position of RSUs can be fixed, while the position of vehicles and pedestrians vary. And, the position of vehicles can vary quickly. How to further enhance the positioning performance of V2X by using the UE becomes a problem urgently to be solved.

Solution to Problem

To overcome or at least partially solve the technical problems, the following technical solutions are particularly provided.

An embodiment of the present disclosure provides a positioning method for user equipment (UE), including:

detecting, by an auxiliary positioning entity, whether a condition of transmitting positioning related information is currently satisfied;

transmitting the positioning related information, if the condition is satisfied;

wherein the positioning related information includes any one of the following:

auxiliary positioning information, and location calculation information fed back for positioning request information transmitted by a target UE.

Another embodiment of the present disclosure further provides a positioning method for UE, including:

receiving, by a target UE, positioning related information transmitted by an auxiliary positioning entity;

determining location information corresponding to the target UE based on the positioning related information;

wherein the positioning related information includes any one of the following:

auxiliary positioning information, and location calculation information fed back for positioning request information transmitted by the target UE.

Another embodiment of the present disclosure further provides a positioning device, including: a detecting module and a transmitting module;

the detecting module is configured to detect whether a condition of transmitting positioning related information is satisfied by an auxiliary positioning entity;

the transmitting module is configured to transmit the positioning related information when the condition is satisfied;

wherein the positioning related information including any one of the following:

auxiliary positioning information, and location calculation information fed back for positioning request information transmitted by a target UE.

Still another embodiment of the present disclosure further provides a positioning device, including: a receiving module and a determining module;

the receiving module is configured to receive the positioning related information transmitted by the auxiliary positioning entity for a target UE;

the determining module is configured to determine a location information corresponding to the target UE based on the positioning related information;

wherein the positioning related information including any one of the following:

auxiliary positioning information, and location calculation information fed back for positioning request information transmitted by the target UE.

Further another embodiment of the present disclosure further provides a UE, including: a processor and a memory; the memory is configured to store computer-readable instructions that, when executed by the processor, make the processor to perform the above method for positioning the UE.

In the positioning method for UE provided by an embodiment of the present disclosure, an auxiliary positioning entity detects whether a condition of transmitting positioning related information is satisfied, which provides a prerequisite for the subsequent whether to transmit positioning related information; the positioning related information is transmitted, if the condition is satisfied; wherein the positioning related information includes any one of the following: auxiliary positioning information, and location calculation information fed back for positioning request information transmitted by a target UE, in order to enable subsequent target UEs to accurately positioning based on the positioning related information.

In the positioning method for UE provided by an embodiment of the present disclosure, a target UE receiving positioning related information transmitted by an auxiliary positioning entity, which provides a prerequisite for subsequent determination of a corresponding geo-location based on the positioning related information; the corresponding geo-location is determined based on the positioning related information. The positioning related information includes any one of the following: auxiliary positioning information, and location calculation information fed back for positioning request information transmitted by the target UE. The method enables target UE to accurately positioning itself based on the positioning related information, and ensures that the target UE may acquire accurate geo-location when failing to obtain a reliable GNSS signal.

The present application provides a method and an equipment for allocating positioning resources. By the method of the present invention, a method for allocating data and a PRS for assisting in positioning is provided and the positioning performance is improved.

For this purpose, the present application employs the following technical solutions.

A method for allocating positioning resources is provided, comprising steps of:

receiving, by a UE, data for assisting in positioning; and receiving, by the UE and according to the data for assisting in positioning, an associated Positioning Reference Signal (PRS) for assisting in positioning.

Preferably, the data for assisting in positioning and the associated PRS for assisting in positioning have fixed timing relationship.

Preferably, the data for assisting in positioning is transmitted within one time window before the associated PRS for assisting in positioning; or the data for assisting in positioning is transmitted within one time window after the associated PRS for assisting in positioning; or the data for assisting in positioning is transmitted within two time windows each before and after the associated PRS for assisting in positioning.

Preferably, resources for carrying the data for assisting in positioning and the associated PRS for assisting in positioning are configured based on a physical index of a Time Unit (TU); or, resources for carrying the data for assisting in positioning and the associated PRS for assisting in positioning are configured based on the logic index of the TU.

Preferably, resources for carrying the PRS for assisting in positioning are configured based on a physical index of the TU and one resource pool for carrying the data for assisting in positioning is configured, based on the physical index or the logic index of the TU;

resources for carrying the PRS for assisting in positioning are configured based on the logic index of the TU and another resource pool for carrying the data for assisting in positioning is configured.

Preferably, the resource pool for carrying the data for assisting in positioning is configured for V2X communication.

Preferably, the data for assisting in positioning indicates associated PRS time-frequency resources and PRS sequences; or, associated PRS time-frequency resources and PRS sequences are obtained implicitly according to the data resources assisting in positioning; or, associated PRS time-frequency resources are obtained implicitly according to the data resources assisting in positioning, and the data for assisting in positioning indicates associated PRS sequences.

Preferably, Reference Signal Received Power (RSRP) and/or a Received Signal Strength Indicator (RSSI) of data resources for assisting in positioning for other UEs are measured within a sensing window and available data resources are selected to transmit data for assisting in positioning;

RSRP and/or RSSI of PRSs for other UEs are measured within a sensing window and available PRS resources are selected; or, RSRP and/or RSSI of data resources for other UEs are measured within a sensing window, and RSRP and/or RSSI of PRSs for other UEs are also measured within the sensing window, so that available data resources and PRS resources are selected on the basis of combinations thereof.

Preferably, the data resources for assisting in positioning are reserved for several periods in which the associated PRS for assisting in positioning is reserved or the associated PRS is obtained according to the data for assisting in positioning.

Preferably, a PRS muting pattern is configured, each bit of which indicates whether data for assisting in positioning and the associated PRS for assisting in positioning are transmitted within one period; or, the PRS muting pattern is configured, each bit of which indicates whether the PRS for assisting in positioning is transmitted and the data for assisting in positioning is always transmitted within one period; or, it is randomly determined whether data for assisting in positioning and the associated PRS for assisting in positioning are transmitted within one period; or, it is randomly determined whether the PRS for assisting in positioning is transmitted and data for assisting in positioning is always transmitted within one period.

Preferably, a PRS muting pattern is configured, each bit of which indicates whether the PRS for assisting in positioning is transmitted in one TU within one period and the data for assisting in positioning is always transmitted within each period; or, it is randomly determined whether the PRS for assisting in positioning is transmitted in one TU within one period and the data for assisting in positioning is always transmitted within each period.

An equipment for allocating positioning resources is provided, comprising an assistant positioning data module and an assistant positioning PRS module, wherein:

the assistant positioning data module is configured to receive data for assisting in positioning; and the assistant positioning PRS module is configured to receive, according to the data for assisting in positioning, an associated PRS for assisting in positioning.

By the method of the present invention, a method for allocating data and associated PRS resources for assisting in positioning is provided. The blind detection operation by a UE is reduced, the precision of positioning measurement is increased, and the positioning performance is improved.

Additional aspects and advantages of the present disclosure will be partially appreciated and become apparent from the descriptions below, or will be well learned from the practices of the present disclosure.

Advantageous Effects of Invention

By means of the method provided by the present application, it may be ensured that the target UE may acquire accurate geo-location in case the target UE fails to obtain a reliable GNSS signal, and it no longer completely relies on the base station's positioning reference signal, thereby effectively improving the adaptability and reliability of the UE positioning function.

BRIEF DESCRIPTION OF DRAWINGS

The above and/or additional aspects and advantageous of the present disclosure will become apparent and be more readily appreciated from the following descriptions of embodiments, with reference to the accompanying drawings, in which:

FIG. 1 is a schematic flowchart of a positioning method for UE according to an embodiment of the present disclosure;

FIG. 2 is a schematic flowchart of another positioning method for UE according to another embodiment of the present disclosure;

FIG. 3 is a schematic flowchart of method for positioning a target UE according to implementation manner 1 of the present disclosure;

FIG. 4 is a schematic flowchart of method for positioning an auxiliary UE according to implementation manner 1 of the present disclosure;

FIG. 5 is a schematic flowchart of method for positioning a target UE according to implementation manner 2 of the present disclosure;

FIG. 6 is a schematic flowchart of method for positioning an auxiliary UE according to implementation manner 2 of the present disclosure;

FIG. 7 is a basic structure schematic diagram of the target UE device according to implementation manner 1 of the present disclosure;

FIG. 8 is a basic structure schematic diagram of the auxiliary UE device according to implementation manner 1 of the present disclosure;

FIG. 9 is a basic structure schematic diagram of the target UE device according to implementation manner 2 of the present disclosure;

FIG. 10 is a basic structure schematic diagram of the auxiliary UE device according to implementation manner 2 of the present disclosure;

FIG. 11 is a basic structure schematic diagram of a positioning device according to further another embodiment of the present disclosure;

FIG. 12 is a basic structure schematic diagram of the positioning device according to still another embodiment of the present disclosure;

FIG. 13 is a block diagram of a computing system for implementing the base station and UE disclosed by the embodiment of the present disclosure; and FIG. 14 is a frame structure of an LTE system;

FIG. 15 is a PRS pattern of an LTE system;

FIG. 16 is a flowchart of the present invention;

FIG. 17 is a schematic diagram 1 of data for assisting in positioning and an associated PRS for assisting in positioning of the present invention;

FIG. 18 is a schematic diagram 2 of data for assisting in positioning and an associated PRS for assisting in positioning of the present invention; and FIG. 19 is a diagram of an equipment of the present invention.

MODE FOR THE INVENTION

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by a person of ordinary skill in the art that term "terminal" and "terminal apparatus" as used herein include not only apparatuses with a wireless signal receiver having no emission capability but also apparatuses with receiving and emitting hardware capable of carrying out bidirectional communication over a bidirectional communication link Such apparatuses may include cellular or other communication apparatuses with a single-line display or multi-line display or without a multiline display; Personal Communication Systems (PCSs) with combined functionalities of speech, data processing, facsimile and/or data communication; Personal Digital Assistants (PDAs), which may include RF receivers, pagers, internet/intranet accesses, web browsers, notepads, calendars and/or Global Positioning System (GPS) receivers; and/or conventional laptop and/or palmtop computers or other apparatuses having and/or including a RF receiver. The "terminal" and "terminal apparatus" as used herein may be portable, transportable, mountable in transportations (air, sea and/or land transportations), or suitable and/or configured to run locally and/or distributed in other places in the earth and/or space for running. The "terminal" or "terminal apparatus" as used herein may be a communication terminal, an internet terminal, a music/video player terminal. For example, it may be a PDA, a Mobile Internet Device (MID) and/or a mobile phone with a music/video playback function, or may be apparatuses such as a smart TV and a set-top box.

In the NR communication scenario, some communication services, such as V2X communication, need to rely on the location information of the UE. However, at present, the positioning mechanism in the LTE system and the GNSS-based positioning mechanism both cannot guarantee that the UE can successfully acquire accurate location information under any circumstances. In order to improve the positioning performance of the UE, a new positioning method is provided by the present application, specifically:

An embodiment of the present disclosure provides a method for positioning a user equipment (UE). As shown in FIG. 1, the method includes the following steps: Step 110: An auxiliary positioning entity detects whether a condition of transmitting positioning related information is satisfied currently. Step 120: the positioning related information is transmitted, if the condition is satisfied. The positioning related information includes any one of the following: auxiliary positioning information, location calculation information fed back for the positioning request information transmitted by the target UE.

According to the method for positioning a UE provided by the embodiment of the present disclosure, the auxiliary positioning entity detects whether the condition for transmitting the positioning related information is satisfied currently, and provides a prerequisite guarantee for subsequent whether or not to transmit the positioning related information. The positioning related information is transmitted, if the condition is satisfied; the positioning related information includes any one of the following: the auxiliary positioning information, the location calculation information fed back for the positioning request information transmitted by the target UE, so as to transmit positioning related information when the corresponding condition is satisfied, enabling subsequent target UEs to accurately positioning based on the positioning related information.

Preferably, the auxiliary positioning entity includes any one of the following: a base station, a UE, a base station type Road Side Unit (RSU) and a UE type RSU;

the auxiliary positioning information includes at least one of the following: a first positioning reference signal, geo-location information of the auxiliary positioning entity, and timing information of the auxiliary positioning entity transmitting the first positioning reference signal;

the auxiliary positioning entity may acquire its own geo-location information when the positioning related information includes the auxiliary positioning information, and the condition of transmitting positioning related information includes at least one of the following:

a Global Navigation Satellite System (GNSS) signal is detected by the auxiliary positioning entity;

indication information of the base station is received by the auxiliary positioning entity;

the current movement speed of the auxiliary positioning entity is zero;

the type of auxiliary positioning entity is RSU;

the number of other auxiliary positioning entities currently detected by the auxiliary positioning entity is smaller than a first preset threshold; and the distance between the auxiliary positioning entity and other currently detected auxiliary positioning entities is greater than a second preset threshold.

Preferably, the step of transmitting positioning related information includes any one of the following scenarios:

determining of a system frame number and a slot number for transmitting positioning related information based on the acquired first preset Universal Time Coordinated (UTC) reference time point of UTC, and transmitting of the positioning related information on a first slot position determined by the system frame number and the slot number;

determining of the system frame number and the slot number for transmitting the positioning related information based on the received timing information of the base station or the base station type RSU or the UE type RSU, and transmitting of the positioning related information on a second slot position determined by the system frame number and the slot number;

determining of the starting point of the slot for transmitting the positioning related information based on at least one of the following items, and transmitting of the positioning related information on a third time slot position determined by the starting point of the slot:

the received timing information of the base station;

the received timing information of the base station type RSU;

the received timing information of the UE type RSU; and a timing advance of the auxiliary positioning information.

Preferably, determining of the system frame number and the slot number for transmitting positioning related information based on the acquired first preset UTC reference time point of UTC includes:

determining of the system frame number and the slot number of the first positioning reference signal included in the positioning related information based on the first preset UTC reference time point;

the step of determining of the system frame number and the slot number for transmitting positioning related information based on the received timing information of the base station or the base station type RSU or the UE type RSU includes:

determining of the system frame number and the time slot number of a data message included in the positioning related information, based on the received timing information of the base station or the base station type RSU or the UE type RSU.

Preferably, the data message includes any one of the following:

geo-location information and indication quantization granularity deviations of the auxiliary positioning entity;

the geo-location information and quantization period deviations of the auxiliary positioning entity;

the geo-location information, the indication quantization granularity deviations and the quantization period deviations of the auxiliary positioning entity;

wherein, the quantization granularity deviations are quantization granularity deviations of the timing information for the auxiliary positioning entity to transmit the first positioning reference signal relative to the second preset UTC reference time point;

the quantization period deviations are quantization period deviations of the timing information for the auxiliary positioning entity to transmit the first positioning reference signal relative to the second preset UTC reference time point.

Preferably, the step of transmitting the positioning related information on the second slot position determined by the system frame number and the slot number includes any one of the following scenarios:

Transmitting of the positioning related information on a preset number of slots preceding the starting point of the second slot position, which is determined according to the first preset UTC reference time point;

transmitting of the positioning related information on a preset number of slots subsequent to the starting point of the second slot position, which is determined according to the first preset UTC reference time point;

transmitting of the positioning related information on the slot determined according to the first preset UTC reference time point, the slot spacing a preset number of slots with the starting point of the second slot position.

Preferably, when the positioning related information includes the location calculation information which is fed back by the auxiliary positioning entity for the positioning request information transmitted by the target UE, before the step of detecting whether the condition of transmitting the positioning related information is satisfied by the auxiliary positioning entity, the method further includes:

receiving of the positioning request information transmitted by the target UE.

Preferably, the location calculation information includes at least one of the following:

time of the auxiliary positioning entity when it receives a second positioning reference signal transmitted by the target UE;

geo-location information of the auxiliary positioning entity when it receives the second positioning reference signal transmitted by the target UE;

identification information of the target UE;

related information generated based on the identification information of the target UE.

Preferably, the step of transmitting the positioning related information includes:

transmitting, by the auxiliary positioning entity, the location calculation information fed back for the positioning request information transmitted by the target UE to the target UE; or, transmitting, by the auxiliary positioning entity, the location calculation information fed back for the positioning request information transmitted by the target UE to a location calculation function entity, so as to transmit the location information of the target UE determined based on the location calculation information by the location calculation function entity.

Another embodiment of the present disclosure provides a positioning method for UE, as shown in FIG. 2, the method includes the following steps: Step 210: the target UE receives the positioning related information transmitted by the auxiliary positioning entity; Step 220: the corresponding geo-location is determined based on the positioning related information. The positioning related information includes any one of the following: auxiliary positioning information, and location calculation information fed back for positioning request information transmitted by the target UE.

In the method for positioning a UE according to an embodiment of the present disclosure, a target UE receives positioning related information transmitted by an auxiliary positioning entity, which provides a prerequisite for subsequent determination of a corresponding geo-location based on positioning related information, and determines a corresponding geo-location based on positioning related information. The positioning related information includes any one of the following: auxiliary positioning information, location calculation information fed back for the positioning request information transmitted by the target UE. The method enables target UE to accurately positioning itself based on the positioning related information, and ensures that the target UE may acquire accurate geo-location when failing to obtain a reliable GNSS signal.

Preferably, the auxiliary positioning entity includes any one of the following: a base station, a UE, a base station type Road Side Unit (RSU) and a UE type RSU;

the auxiliary positioning information includes at least one of the followings:

a first positioning reference signal, geo-location information of the auxiliary positioning entity, and timing information of the first positioning reference signal transmitted by the auxiliary positioning entity.

Preferably, when the positioning related information includes the auxiliary positioning information transmitted by the auxiliary positioning entity, the step of determining of the location information corresponding to the target UE based on the positioning related information includes:

determining of an Observed Time Difference of Arrival (OTDOA) according to the time of receiving the first positioning reference signals transmitted by the plurality of auxiliary positioning entities respectively;

determining of the location information corresponding to the target UE according to the OTDOA and the geo-location information of the plurality of auxiliary positioning entities.

Preferably, the step of determining the OTDOA according to the time of receiving the first positioning reference signals respectively transmitted by the plurality of auxiliary positioning entities includes any one of the following scenarios:

determining of the OTDOA according to the time of receiving the plurality of first positioning reference signals and the length of the current carrier slot, when the plurality of auxiliary positioning information each does not include quantization granularity deviations and quantization period deviations, wherein the quantization granularity deviations are quantization granularity deviations of the timing information of the auxiliary positioning entity transmitting the first positioning reference signal relative to the second preset 1UTC reference time point, wherein the quantization period deviations are quantization period deviations of the timing information of the auxiliary positioning entity transmitting the first positioning reference signal relative to the second preset 1UTC reference time point;

determining of the OTDOA, according to the time of receiving the plurality of first positioning reference signals, the length of the current carrier slot and a plurality of quantization granularity deviations, when the plurality of auxiliary positioning information each include the quantization granularity deviations, or each include the quantization granularity deviations and the quantization period deviations and each quantization period deviation is equal to each other;

determining of the OTDOA, according to the time of receiving the first positioning reference signal of the auxiliary positioning entity with the smallest quantization granularity, the time of receiving the first positioning reference signal of the auxiliary positioning entity with the largest quantization granularity, the length of the current carrier slot and the minimum and the maximum of the plurality of quantization granularity deviations, when the plurality of auxiliary positioning information each include the quantization granularity deviations and the quantization period deviations and each quantization period deviation is not equal;

determining of the OTDOA according to the time of receiving the plurality of the first positioning reference signals, the length of the current carrier slot and the quantization granularity deviations, when any one of the following conditions is satisfied:

at least one of the plurality of the auxiliary positioning information includes the quantization granularity deviations and the quantization period deviations, and other auxiliary positioning information do not include the quantization granularity deviations and the quantization period deviations;

at least one of the plurality of the auxiliary positioning information includes the quantization granularity deviations but does not include the quantization period deviations, and other auxiliary positioning information do not include the quantization granularity deviations and the quantization period deviations.

Preferably, the step of determining the location information corresponding to the target UE according to the geo-location information of the plurality of auxiliary positioning entities and the OTDOA includes:

reporting of the identification information of the plurality of auxiliary positioning entities and the OTDOA to the location calculation function entity, and receiving of feedback information of the location calculation function entity;

determining of the location information corresponding to the target UE, according to the received feedback information.

Preferably, the step of reporting of the identification information of the plurality of auxiliary positioning entities and the OTDOA to the location calculation function entity, specifically includes the following step of:

reporting of the OTDOA, the identification information of the plurality of auxiliary positioning entities, the geo-location information of the plurality of auxiliary positioning entities, the quantization granularity deviation, and/or the quantization period deviation to the location calculation functional entity, if the plurality of auxiliary positioning entities include the UE and UE type RSU, and the quantization granularity deviations and/or the quantization period deviations of the timing information of the UE or the UE type RSU transmitting the first positioning reference signal relative to the second preset UTC reference time point.

Preferably, when the positioning related information includes the location calculation information fed back by the auxiliary positioning entity for positioning request information transmitted by a target UE, before the step of receiving, by the target UE, the positioning related information transmitted by the auxiliary positioning entity, further including:

Detecting, by the target UE, whether the condition of transmitting positioning request information is satisfied;

transmitting the positioning request information to the auxiliary positioning entity, if the condition is satisfied.

Preferably, the condition for transmitting the positioning request information includes any one of the following:

no GNSS signal being detected, or no first positioning reference signal being received;

wherein the positioning request information includes at least one of the following:

the second positioning reference signal transmitted by the target UE, and the identification information of the target UE corresponding to the second positioning reference signal; the second positioning reference signal being used for calculating the relative location of the auxiliary positioning entity relative to the target UE.

Preferably, the step of receiving, by a target UE, the positioning related information transmitted by the auxiliary positioning entity includes:

receiving of the location calculation information corresponding to the second positioning reference signal and fed back respectively by the plurality of auxiliary entities; or, receiving of the location information corresponding to the second positioning reference signal and fed back respectively by the plurality of auxiliary entities through location calculation function entity;

wherein, the location calculation information includes at least one of the following:

the time when the plurality of auxiliary positioning entities receives the second positioning reference signal transmitted by the target UE respectively;

its own geo-location information when the plurality of auxiliary positioning entities receives the second positioning reference signal transmitted by the target UE respectively;

identification information of the target UE;

related information generated based on the identification information of the target UE.

Preferably, the plurality of auxiliary positioning entities respectively determines the time of receiving the second positioning reference signal transmitted by the target UE based on the same time standard.

It should be noted that the first positioning reference signal refers to a positioning reference signal transmitted by the auxiliary positioning entity, and the second positioning reference signal refers to a positioning reference signal transmitted by the target UE.

In addition, unless otherwise specified in the following, the target UE refers to a UE that obtains positioning information based on the positioning method provided in the present application. Meanwhile, a UE or a UE type RSU included in the auxiliary positioning entity is collectively referred to as an auxiliary UE, that is, the auxiliary UE refers to the UE or UE type RSU that provides auxiliary positioning information for the target UE.

Among others, in the technical solution provided by the present application, the auxiliary UE and other auxiliary positioning function entities transmit the auxiliary positioning information after a certain condition is satisfied, and the target UE determines its own geo-location by receiving auxiliary positioning signals of the auxiliary UE and other auxiliary positioning function entities; alternatively, the target UE transmits the positioning request information to the auxiliary positioning entity after the a certain condition is satisfied, and the auxiliary UE or other auxiliary positioning function entities calculates the location calculation information after receiving the positioning request of the target UE, and feeds the location calculation information back to the location calculation function entity, or directly feeds the location calculation information back to the target UE, so that the target UE determines its own geo-location by receiving information of the location calculation function entity or by processing the location calculation information by itself. By means of the method provided by the present application, it may be ensured that the target UE can acquire accurate geolocation when failing to obtain a reliable GNSS signal. In the positioning process based on the cellular network, due to the introduction of a UE-type positioning reference signal (i.e., auxiliary positioning reference signal), it no longer only relies on the positioning reference signal of the base station, thereby effectively improving the adaptability and reliability of the UE positioning function.

In the following, the positioning method provided by the present application is briefly introduced by the following implementation manners, in which:

Implementation Manner 1:

In order to improve the positioning performance of the UE, the present application provides a new positioning method. Implementation manner 1 of the method is as shown in FIG. 3. The target UE includes the following steps:

Step S301: The target UE detects the auxiliary positioning information transmitted by the auxiliary positioning entity.

The auxiliary positioning entity may be a base station, a UE, or a Road Side Unit (RSU), wherein the RSU includes a base station type RSU and a UE type RSU. The auxiliary positioning information should at least include one of the following information: a positioning reference signal (i.e., a first positioning reference signal) used for calculating a relative location between the target UE and the auxiliary positioning entity, a geo-location of the auxiliary positioning entity, and timing information of the auxiliary positioning entity transmitting the positioning reference signal, etc.

Step S302: The target UE determines its own geo-location according to the auxiliary positioning information.

Meanwhile, taking the UE-type auxiliary positioning entity (i.e., auxiliary UE) as an example, operation steps on the auxiliary positioning entity side corresponding to implementation manner 1 of the method are briefly introduced, as shown in FIG. 4, the auxiliary UE specifically includes the following steps:

Step S401: The auxiliary UE determines whether the condition of transmitting the auxiliary positioning information is satisfied currently.

The condition for transmitting the auxiliary positioning information by the auxiliary UE may include at least one of the followings: The auxiliary UE is currently able to detect a reliable GNSS signal, the auxiliary UE receives the indication information of the base station, current movement speed of the auxiliary UE is zero, and the type of the UE is the RSU, the number of auxiliary positioning entities currently detected by the auxiliary UE is less than a certain threshold 1, and the distance between the auxiliary UE and the currently detectable auxiliary positioning entity is greater than a certain threshold 2, or the like.

Step S402: The auxiliary UE transmits the auxiliary positioning information when the condition of transmitting the auxiliary positioning information is satisfied.

Among others, the auxiliary positioning information transmitted by the auxiliary UE should include at least one of a positioning reference signal (i.e., a first positioning reference signal), timing information of the auxiliary positioning entity transmitting the positioning reference signal, its own geo-location, and the like.

Implementation Manner 2:

Implementation manner 2 of the method is shown in FIG. 5, wherein the target UE includes the following steps:

Step S501: The target UE determines whether the condition of transmitting positioning request information is satisfied.

The target UE may transmit the positioning request information in the case that it cannot detect a reliable GNSS signal, or it cannot receive a sufficient PRSs in the LTE system. The positioning request information should at least include a positioning reference signal (i.e., a second positioning reference signal), which is used for calculating the relative location of the auxiliary UE relative to the target UE by the auxiliary UE.

Step S502: The target UE transmits the positioning request information after the condition of transmitting the positioning request information is satisfied.

Step S503: The target UE determines its own location.

The target UE may determine its own location information by receiving the location calculation information fed back by the auxiliary UE, or determine its own location information by receiving the location calculation information fed back by the location calculation function entity.

At the same time, taking the auxiliary UE as an example, the operation steps on the auxiliary positioning entity side corresponding to implementation manner 2 of this method are briefly introduced. As shown in FIG. 6, the auxiliary UE specifically includes the following steps:

Step S601: The auxiliary UE detects the positioning request information of the target UE.

The auxiliary UE may perform the above operation when a certain condition is satisfied, for example, when the auxiliary UE may detect a reliable GNSS signal, the auxiliary UE may acquire accurate location information and timing information, or the auxiliary UE may receive an indication of the base station or the base station type RSU.

Step S602: The auxiliary UE forwards the location calculation information to the location calculation function entity.

Among others, the location calculation information should at least include the time when the auxiliary UE receives the positioning request information of the target UE, the geo-location information when the auxiliary UE receives the positioning request information of the target UE, and the ID information of the target UE, etc. The ID of the target UE refers to an identification by which the location calculation function entity uniquely identifies the target UE.

In addition, the location calculation function entity may be a transmission UE (i.e., a target UE), a base station or another independent physical entity, which transmits the positioning request information received by the auxiliary UE.

In order to facilitate the understanding of the present application, the above technical solutions of the present application are further described in terms of interaction modes between devices in combination with specific application scenarios, as follows:

Embodiment 1

This embodiment is for a UE-type auxiliary positioning entity in implementation manner 1. The UE-type auxiliary positioning entity includes a convention UE or a UE type RSU, which is hereinafter collectively referred to as an auxiliary UE. The auxiliary location information transmitted by the auxiliary UE should at least include the positioning reference signal (i.e., the first positioning reference signal), and in addition, it may include timing information for indicating the auxiliary UE to transmit the positioning reference signal or a data message of the geo-location information of the auxiliary UE. In the embodiment 1, the auxiliary UE may determine the system frame number and the slot number for transmitting the auxiliary positioning information by means of receiving the configuration and pre-configuration of the base station, standard definition and the like.

Among others, the auxiliary UE must be a UE capable of accurately acquiring its own location information. The auxiliary UE may transmit the auxiliary positioning information when at least one of the following conditions is satisfied: The auxiliary UE is currently able to detect a reliable GNSS signal, and the auxiliary UE receives the indication information of the base station, the current movement speed of the auxiliary positioning entity is zero, and the type of the auxiliary UE is RSU, the number of the auxiliary positioning entities currently detected by the auxiliary UE is less than a certain threshold 1, and the distance between the auxiliary UE and the currently detectable auxiliary positioning entity is greater than a certain threshold 2. The certain threshold 1 and the certain threshold 2 may all be configured by the base station, preconfigured or standard defined. That is, when the positioning related information includes the auxiliary positioning information, the auxiliary positioning entity acquires its own geo-location information, and the condition of transmitting the positioning related information includes at least one of the followings: the auxiliary positioning entity detects a GNSS signal; the auxiliary positioning entity receives the indication information of the base station; the current movement speed of the auxiliary positioning entity is zero; the type of the auxiliary positioning entity is RSU; the number of other auxiliary positioning entities currently detected by the auxiliary positioning entity is less than the first preset threshold; the distance between the auxiliary positioning entity and currently detected other auxiliary positioning entities is greater than the second preset threshold.

In addition, the transmitting of the positioning related information includes any one of the following scenarios: based on the obtained first preset UTC reference time point of UTC, determining of a system frame number and a slot number for transmitting the positioning related information, and transmitting of positioning related information on a first slot position determined by the system frame number and slot number; based on the received timing information of the base station or base station type RSU or UE type RSU, determining of the system frame number and time slot number for transmitting the positioning related information, and transmitting the positioning related information on the second slot position determined by the system frame number and time slot number; determining of the starting point of the slot for transmitting positioning related information based on at least one of the following items, and transmitting the positioning related information on the third slot position determined by the starting point of the slot: received timing information of base station; received timing information of base station type RSU; received timing information of UE type RSU; timing advance of auxiliary positioning information. It is specifically divided into three scenarios as follows:

In the first scenario, if the auxiliary UE satisfies the condition of transmitting the auxiliary positioning information, the auxiliary UE may accurately acquire the UTC timing, and the auxiliary UE uses a certain common UTC reference time point Tref110 (i.e., the first preset UTC reference time point) to determine the system frame number (DFN) and slot number (S), and further determines the starting point of the system frame and slot, and then transmits the auxiliary positioning information in the corresponding slot position, that is, the auxiliary UE transmits the auxiliary positioning information on the above-mentioned first slot position. Without loss of generality, it is assumed that all auxiliary UEs may use the Greenwich mean time Jan. 1, 1900, 00:00:00 as the first preset UTC reference time point Tref110 and then determines the current DFN number by the formula DFN=Floor ((Tcurrent110−Tref110−offsetDFN)/s/D)mod P, wherein, Floor indicates the rounding operation, s indicates the length of the current carrier slot, Tcurrent110 indicates the current time, and offsetDFN indicates the DFN offset configured or preconfigured by current carrier, P indicates the number of system frames included in a system frame period, D indicates the number of slots included in a system frame; then the current slot number is determined by S=Floor((Tcurrent110−Tref110−offsetDFN)/s)mod D, wherein Tcurrent110, Tref110, offsetDFN, and s are in milliseconds. In addition, the value of the parameter offsetDFN may be always 0, or a specific value configured or pre-configured by the base station. If the value of the parameter offsetDFN is a specific value configured or pre-configured by the base station, the auxiliary UE should further transmit a data message to indicate the value of offsetDFN. That is, when the UTC may be acquired, the system frame number and the slot number for transmitting the auxiliary positioning information are determined based on the first preset UTC reference time point, and the auxiliary positioning information is transmitted on the first slot position determined collectively by the system frame number and the slot number.

In the second scenario, if the auxiliary UE satisfies the condition of transmitting the auxiliary positioning information, the auxiliary UE may accurately acquire the UTC timing, and the auxiliary UE determines the system frame number (DFN) and the slot number (S) according to the timing provided by the base station, the base station type RSU, or the UE type RSU, and further determines the starting point of the system frame and the slot, that is, the auxiliary UE transmits the auxiliary positioning information on the above-mentioned second slot position. In this case, the auxiliary UE may transmit the auxiliary positioning information in the following three implementation manners:

In the first implementation manner, the auxiliary positioning information transmitted by the auxiliary UE should include a data message to indicate a quantization granularity deviation $\Delta g120$ and/or a quantization period deviation $\Delta p120$ of the timing information of the auxiliary UE transmitting the positioning reference signal relative to a certain common UTC reference time point Tref120 (i.e., the second preset UTC reference time point). Tref120 may be the same as Tref110, or Tref120 is the starting point of subframe Floor((Tcurrent120−Tref110−offsetDFN)/s)mod D, or Tref120 is the UTC timing configured by the base station, the base station type RSU or the UE type RSU, or Tref120 is a certain preconfigured UTC timing. In this case, $\Delta 120$=Floor((Tcurrent120−Tref120)/g120)mod P120, $\Delta p120$=Floor ((Tcurrent120−Tref100)/g120/P120) mod 2, wherein g120 is the quantization granularity of $\Delta g120$, in milliseconds; P120 is the quantization period of $\Delta g120$, which is a positive integer; g120 and P120 are specific values that may be configured or preconfigured by the base station, or be standard defined. Preferably, the value of P120*g120 should be much larger than the maximum deviation of the sub-frame timings of different auxiliary UEs, for example, g120=0.001 milliseconds, P120 is equal to 1000; Tcurrent120 indicates the UTC time or GPS time in milliseconds corresponding to the starting point of the slot of the auxiliary UE transmitting the positioning reference signal according to the current base station timing. The auxiliary UE should adjust the slot position for transmitting the positioning reference signal so that the starting point SP120 of the slot is Tref120+Floor((Tcurrent120−Tref120)/g120) *g120. In addition, the data message carrying $\Delta g120$ and $\Delta p120$ transmitted by the auxiliary UE uniquely corresponds to the positioning reference signal in the time slot SP120, and the one-to-one correspondence between the two may be explicitly indicated in the data message. The correspondence is configured by the base station, or defined by the standard.

In the second implementation manner, the auxiliary UE uses a certain common UTC reference time point Tref110 (i.e., the first preset UTC reference time point) to determine the frame number (DFN) and the slot number (S) for transmitting the auxiliary system, and further determines the system frame and the starting point of slot, then transmits the auxiliary positioning information on the slot transmitting auxiliary positioning information. If the auxiliary positioning information includes the data message and the positioning reference signal, the auxiliary UE may determine the transmission slot of the data message according to the timing information of the base station, the base station type RSU or the UE type RSU, and determine the transmission slot of the positioning reference signal according to the UTC reference time Tref110 (i.e., the first preset UTC reference time point), wherein the data message at least includes the geo-location information of the auxiliary UE, and sometimes includes the timing information of transmitting the positioning reference signal. Herein, the content of the data message is not limited and the processing manners are all the same. If there is a conflict between when the auxiliary UE uses a timing information different from the base station or RSU timing information to transmit the positioning reference signal and when the auxiliary UE uses the base station or RSU timing information to transmit data information at the same time, the auxiliary UE should firstly perform the transmission with high priority. The priority order is defined by the standard, or configured by the base station.

In a third implementation manner, the auxiliary UE uses the timing information of the base station, the base station type RSU, or the UE type RSU to determine the slot position corresponding to the transmitting slot number of the auxiliary positioning information, and then transmits the auxiliary positioning information on a full slot, a preset number of slots (for example, the first one) preceding the starting point of the slot, which is determined according to the UTC reference time point Tref110 (i.e., the first preset UTC reference time point), or on a full slot, a preset number of slots (e.g., the first one) subsequent to the starting point of the slot, which is determined according to the UTC reference time point Tref110 (i.e., the first preset UTC reference time point), or on a full slot, the nearest slot according to the UTC reference time point Tref110, that is, the auxiliary positioning information is transmitted on the slots spacing preset number of slots with the starting point of the second slot position, which is determined according to the UTC reference time point Tref110. If the auxiliary positioning information includes the data message and the positioning reference signal, the auxiliary UE may determine the transmission slot of the data message according to the timing information of the base station, the base station type RSU or the UE type RSU, and determines the transmission slot of the positioning reference signal according to the UTC reference time Tref110 (i.e., the first preset UTC reference time point). If there is a conflict between when the auxiliary UE uses a timing information different from the base station or RSU timing information to transmit the positioning reference signal and when the auxiliary UE uses the base station or RSU timing information to transmit data message at the same time, the auxiliary UE should firstly perform the transmission with high priority. The priority order is defined by the standard or the base station.

The above-mentioned first implementation manner, second implementation manner, and third implementation manner may be summarized as follows: the system frame number and the slot number for transmitting positioning related information are determined based on the acquired first preset UTC reference time point of UTC, which includes: the system frame number and the slot number of a first positioning reference signal included in the positioning related information are determined based on the first preset UTC reference time point; the system frame number and the slot number for transmitting the positioning related information are determined based on the received timing information of the base station or the base station type RSU or the UE type RSU, which includes: the system frame number and slot number of the data message included in the positioning related information are determined based on the received timing information of the base station or the base station type RSU or the UE type RSU. The data message includes any one of the following: geo-location information and the indication quantization granularity deviation of the auxiliary positioning entity; geo-location information and quantization period deviation of the auxiliary positioning entity; geo-location information, indication quantization granularity deviation and quantization period deviation of the auxiliary positioning entity; quantization granularity deviation is the quantization granularity deviation of the timing information for the auxiliary positioning entity to transmit the first positioning reference signal relative to the second preset UTC reference time point; the quantization period deviation is the quantization period deviation of the timing information for the auxiliary positioning entity to transmit the first positioning reference signal relative to the second preset UTC reference time point.

In addition, the above-mentioned third implementation manner may be summarized as: the positioning related information is transmitted on the second slot position determined by the system frame number and the slot number, including any of the following scenarios: the positioning related information is transmitted on a slot, a preset number of slots preceding the starting point of the second slot position, which is determined according to the first preset UTC reference time point; the positioning related information is transmitted on a slot, a preset numbers of slots subsequent to the starting point of the second slot position, which is determined according to the first preset UTC reference time point; the positioning related information is transmitted on a slot determined according to the first preset UTC reference time point, which spaces a preset number of slots with the starting point of the second slot position.

Scenario 3: If the auxiliary UE cannot acquire accurate UTC timing when the condition for transmitting the auxiliary positioning information is satisfied, the auxiliary UE transmits the auxiliary positioning information according to the timing information provided by the base station, the base station type RSU, or the UE type RSU and/or the transmission timing advance signaling of the auxiliary positioning information. That is, when the UTC cannot be acquired, the starting point of the slot for transmitting the auxiliary positioning information is determined based on the received the timing information of the base station, the base station type RSU, or the UE type RSU and/or the transmission timing advance of the auxiliary positioning information, and the auxiliary positioning information is transmitted on the third slot position determined by the slot starting point. Specifically, if the base station, base station type RSU, or UE type RSU does not provide the transmission timing advance of auxiliary positioning information, the auxiliary UE determines the starting point of the slot for transmitting the auxiliary positioning information according to the timing information provided by the base station, base station type RSU, or UE type RSU. However, if the base station, base station type RSU, or UE type RSU provides the transmission timing advance TA130 of the auxiliary positioning information, the starting point of the slot for auxiliary UE to transmit the positioning reference signal in the auxiliary positioning information should be S130+TA130, in which S130 is the starting point of the transmission subframe of the positioning reference signal determined by the auxiliary UE according to the timing information provided by the base station, the base station type RSU, or the UE type RSU.

It needs special explanation that the transmission advance of the auxiliary positioning information may be different from the transmission advance of transmitting the uplink signal currently by the auxiliary UE, and the configuration signaling of transmission timing advance of the auxiliary positioning information from the base station, the base station type RSU or the UE type RSU should be different from the configuration signaling of uplink transmission advance. The base station, the base station type RSU, or the UE type RSU may indicate the slot number for transmitting positioning reference signal subsequently and the value of the transmission timing advance of the auxiliary positioning reference information of the auxiliary UE through a physical downlink control channel (PDCCH).

Embodiment 2

This embodiment is directed to a target UE in implementation manner 1. In the embodiment, the target UE receives auxiliary positioning information of an auxiliary positioning entity to determine its own location, wherein the auxiliary positioning entity may be a UE, a base station, a base station type RSU, or a UE type RSU. In this embodiment, different auxiliary positioning entities use the same timing to determine the transmission time of transmitting the positioning reference signal (i.e., the first positioning reference signal), that is, the starting points of the slots for the related auxiliary positioning entities transmitting the first positioning reference signal are all the same or interval between the slots of each other is an integral plurality of the slot length.

In the following, taking that the target UE receives positioning reference signals from two different auxiliary positioning entities as an example, how the target UE determines its own location will be briefly described. According to an implementation manner of this embodiment, the target UE determines the OTDOA by comparing the positioning reference signal reception time from two different auxiliary positioning entities, and determines its own location by the geo-location information of each auxiliary positioning entity and a plurality of OTDOAs, that is, when the positioning related information includes the auxiliary positioning information transmitted by the auxiliary positioning entity, the positioning information corresponding to the target UE is determined based on the positioning related information which includes: the OTDOA is determined according to the time of receiving the first positioning reference signals respectively transmitted by the plurality of auxiliary positioning entities; the location information corresponding to the target UE is determined according to the geo-location information of the plurality of auxiliary positioning entities and the OTDOA. The definition of the reception time of positioning reference signal of different auxiliary positioning entities for the target UE should be the same. For example, the reception time of the positioning reference signal may be the starting point of the positioning reference signal transmission slot, or the starting point of the first positioning reference signal in the positioning reference signal transmission slot. For any two auxiliary positioning entities E211 and E212 received by the target UE, the target UE considers that the system frame and slot timing used when transmitting the positioning reference signal are the same, that is, both use the system frame and slot number determined by the common UTC reference time point Tref110 (first preset UTC reference time point), or the system frame and the slot number determined by the timing provided by the same base station or base station type RSU. That is, a plurality of auxiliary positioning entities determine respectively the time of receiving the second positioning reference signal transmitted by the target UE based on the same time standard.

Assume that the reception time when the positioning reference signals of E211 and E212 are received by the target UE are Tr211 and Tr212, respectively, wherein OTDOA is determined according to the time of receiving the first positioning reference signals respectively transmitted by the plurality of auxiliary positioning entities, which includes any one of the following scenarios: (1) If the auxiliary positioning information transmitted by E211 and E212 each does not include a data message, or the transmitted data message does not include a quantization granularity deviation and a quantization period deviation, the target UE may determine the OTDOA between E211 and E212 is (Tr211% s)−(Tr212% s), wherein s indicates the length of the current carrier slot, and % indicates the previous variable MOD the latter variable, that is, when a plurality of auxiliary positioning information each does not include the quantization granularity deviation and quantization period deviation, the OTDOA is determined according to the time of receiving the plurality of first positioning reference signals and the length of the current carrier slot; (2) If the auxiliary positioning information transmitted by E211 and E212 both include the quantization granularity deviation $\Delta$g211 and $\Delta$g212, but does not include the quantization period deviation, the target UE may determine that the OTDOA between E211 and E212 is (Tr211% s)−(Tr212% s)+$\Delta$g212−$\Delta$g211, that is, when plurality of auxiliary positioning information each include the quantization granularity deviation but does not include the quantization period deviation, the OTDOA is determined according to the plurality of time of receiving the plurality of first positioning reference signal, the length of the current carrier slot, and the plurality of quantization granularity deviations; (3) If the auxiliary positioning information transmitted by E211 and E212 both include the quantization granularity deviation $\Delta$g211 and $\Delta$g212, both include the quantization period deviation $\Delta$p211 and $\Delta$p212, and $\Delta$p211 and $\Delta$p212 are equal, the target UE may determine that the OTDOA between E211 and E212 is (Tr211% s)−(Tr212% s)+$\Delta$g212−$\Delta$g211, that is, when plurality of auxiliary positioning information each include the quantization granularity deviation and quantization period deviation and the quantization period deviations are equal, the OTDOA is determined according to the time of receiving the plurality of first positioning reference signals, the length of the current carrier slot, and the plurality of quantization granularity deviations; (4) If the auxiliary positioning information transmitted by E211 and E212 each include the quantization granularity deviations $\Delta$g211 and $\Delta$g212, and each include the quantization period deviations $\Delta$p211 and $\Delta$p212, and $\Delta$p211 and $\Delta$p212 are not equal, the target UE may determine that the OTDOA between E211 and E212 is (Tm % s)−(Tx % s)+$\Delta$gm−$\Delta$gx+P210, wherein Tm is the positioning reference signal reception time of the auxiliary positioning entity with a small quantization granularity deviation, Tx is the positioning reference signal reception time of the auxiliary positioning entity with a large quantization granularity deviation, $\Delta$gm indicates the minimum value between $\Delta$g211 and $\Delta$g212, $\Delta$gx indicates the maximum value between $\Delta$g211 and $\Delta$g212, and P210 indicates the quantization period of $\Delta$g211 and $\Delta$g212. That is, when the plurality of auxiliary positioning information each include the quantization granularity deviation and the quantization period deviation, and the quantization period deviations are not equal, the OTDOA is determined according to the time of receiving the first positioning reference signal of the auxiliary positioning entity with the smallest quantization granularity, the time of receiving the first positioning reference signal of the auxiliary positioning entity with the largest quantization granularity, the length of the current carrier slot, the minimum value among plurality of quantization granularity deviations, and the maximum value among plurality of quantization granularity deviations; (5) If the auxiliary positioning information transmitted by E211 includes a quantization granularity deviation $\Delta$g211 and/or a quantization period deviation $\Delta$p211, but the auxiliary positioning information transmitted by E212 does not include the above information, the target UE may determine that the OTDOA between E211 and E212 is (Tr211% s)−(Tr212% s)−$\Delta$g211. That is, the OTDOA is determined according to the time of receiving a plurality of first positioning reference signal, a length of the current carrier slot, and a quantization granularity deviation, when any one of the following conditions is satisfied: at least one of the plurality of auxiliary positioning information includes the quantization granularity deviation and the quantization period deviation, and other auxiliary positioning information does not include the quantization granularity deviation and the quantization period deviation; at least one of a plurality of auxiliary positioning information includes the quantization granularity deviation but does not include the quantization period deviation, and other auxiliary positioning information does not include the quantization granularity deviation and the quantization period deviation.

According to another implementation manner of this embodiment, the target UE determines the OTDOA by comparing the positioning reference signal reception times from two different auxiliary positioning entities, and then reports the received OTDOA and identification information of each auxiliary positioning entity (such as a unique ID of the positioning auxiliary entity in the network) to a location calculation function entity (such as a positioning server), and then determines its own location information by receiving feedback information of the location calculation function entity (such as the positioning server). That is, the location information corresponding to the target UE is determined according to the geo-location information of the plurality of auxiliary positioning entities and the OTDOA, including: the identification information of the plurality of auxiliary positioning entities and the OTDOA are reported to the location calculation function entity, and the feedback information of the location calculation function entity is received; the location information corresponding to the target UE is determined according to the received feedback information.

In this case, if there is an auxiliary UE in the auxiliary positioning entity received by the target UE, and the auxiliary positioning information transmitted by the auxiliary UE includes the quantization granularity deviation $\Delta g220$ and/or the quantization period deviation $\Delta p220$ of the timing information of the auxiliary UE transmitting the positioning reference signal relative to the common UTC reference time point (i.e., the second preset UTC reference time point). The target UE may further report the geo-location information of the auxiliary UE, $\Delta g220$ and/or $\Delta p220$ to the location calculation function entity (e.g., the positioning server), that is the identification information of the plurality of auxiliary positioning entities and the OTDOA are reported to the location calculation function entity, including: the OTDOA, the identification information of the plurality of auxiliary positioning entities, the geo-location information of the plurality of auxiliary positioning entities, the quantization granularity deviation and/or the quantization period deviation are reported to the location calculation functional entities, if the plurality of auxiliary positioning entities include UE or UE type RSU, and the received auxiliary positioning information includes the quantization granularity deviation and/or the quantization period deviation of the timing information of the UE or the UE type RSU transmitting the first positioning reference signal relative to the second preset UTC reference time point.

Embodiment 3

This embodiment is directed to a target UE in implementation manner 2. In this third embodiment, when the target UE cannot acquire accurate location information, the target UE transmits the positioning request information to the auxiliary positioning entity, that is, before the target UE receives the positioning related information transmitted by the auxiliary positioning entity, the method further includes: the target UE detects whether the condition of transmitting the positioning request information is satisfied; and the positioning request information is transmitted to the auxiliary positioning entity, if it is satisfied. Wherein, the condition of transmitting the positioning request information includes any one of the following: no GNSS signal being detected, or no first positioning reference signal being received. The positioning request information should at least include the second positioning reference signal (i.e., the positioning reference signal transmitted by the target UE), and may also include the data information corresponding to the second positioning reference signal in a one-to-one correspondence for carrying the identification information of the target UE. That is, the positioning request information includes at least one of the following: the second positioning reference signal transmitted by the target UE and the identification information of the target UE corresponding to the second positioning reference signal; and the second positioning reference signal is used to calculate the relative location between the auxiliary positioning entity and the target UE by the auxiliary positioning entity. The target UE may transmit the positioning request information on an uplink carrier or uplink resource, or transmit the positioning request information on a bypass carrier or a bypass resource. The time-frequency position for transmitting the positioning request information by the target UE is configured by the base station, if the positioning request information is transmitted on the uplink carrier or uplink resource; the time-frequency resource used for transmitting the positioning request information may be configured by the base station, pre-configured, or standard defined, if the positioning request information is transmitted on the bypass carrier or the bypass resource.

According to an implementation manner of this embodiment, after the target UE transmits the positioning request information, it receives the information from the location calculation function entity (e.g., a positioning server), and determines its own geo-location information according to the content in the information, that is, the target UE receives the positioning related information transmitted by the auxiliary positioning entity, which includes: location calculation information corresponding to the second positioning reference signal fed back by plurality of auxiliary positioning entities is received.

According to another implementation manner of the present application, after the target UE transmits a positioning request, it receives location calculation information fed back by plurality of auxiliary positioning entities, and then determines its own location information according to location calculation information fed back by plurality of auxiliary positioning entities, that is, the target UE receives the positioning related information transmitted by the auxiliary positioning entity, which includes: the location information corresponding to the second positioning reference signal fed back by the plurality of auxiliary positioning entities are received through the location calculation function entity, wherein the location calculation information includes at least one of the following: the time when the plurality of auxiliary positioning entities respectively receive the second positioning reference signal transmitted by the target UE; the respective location information when the plurality of auxiliary positioning entities respectively receive the second positioning reference signal transmitted by the target UE; and the identification information of the target UE; the related information generated based on the identification information of the target UE.

The auxiliary positioning entity may be a base station, an auxiliary UE or a base station type RSU, or a UE type RSU, and the location calculation information fed back should at least include the time of the auxiliary positioning entity when it receives the positioning reference signal transmitted by the target UE and the geo-location information of the auxiliary positioning entity when it receives the positioning reference signal transmitted by the target UE. If the auxiliary positioning entity is a base station or a base station type RSU, the above-mentioned location calculation information fed back may be transmitted through a downlink carrier or a downlink resource, and the target UE acquires the position of the downlink carrier or the downlink resource by base station scheduling signaling. If the auxiliary positioning entity is an auxiliary UE, the above-mentioned location calculation information fed back is transmitted bypass carrier or bypass resource, and the target UE determines the bypass carrier and bypass resource by the configuration and pre-configuration of the base station, or standard definition.

Any location calculation information fed back corresponds to the only one positioning reference signal transmitted by the only target UE in the network. When the location calculation information fed back is transmitted through the bypass carrier or the bypass resource, if the location calculation information fed back is transmitted in a broadcast format, the location calculation information fed back should include identity information of the target UE. Preferably, any one of the location calculation information fed back for the target UE corresponds to the positioning reference signal transmitted most recently before the target UE receives the location calculation information fed back.

The definition of the reception time of positioning reference signal in the location calculation information fed back by all auxiliary positioning entities should be the same. For example, it may be expressed as the UTC time or the GPS time corresponding to the starting point of the positioning reference signal transmission slot, or the UTC time or GPS time corresponding to the starting point of the first positioning reference signal in the positioning reference signal slot.

Embodiment 4

This embodiment is directed to an auxiliary positioning entity of a UE type in implementation manner 2. A UE-type auxiliary positioning entity includes a regular UE or a UE-type RSU, which is hereinafter collectively referred to as an auxiliary UE. The auxiliary UE must be a UE that may accurately acquire its own geo-location information. The auxiliary UE may receive and parse the positioning request information when at least one of the following conditions is satisfied: the UE is currently able to detect a reliable GNSS signal, the UE receives the indication information of the base station, the movement speed of UE currently is zero and the type of UE is RSU. For the positioning reference signal, transmitted by any target UE, received by the auxiliary UE, the auxiliary UE should determine the reception time of the positioning reference signal, that is, before the auxiliary UE feedbacks the location calculation information, it should receive the positioning request information transmitted by the target UE in advance and determine the receipt time of the positioning reference signal. The reception time of the positioning reference signal may be defined as the UTC time or the GPS time corresponding to the starting point of the positioning reference signal transmission slot, or the UTC time or the GPS time corresponding to the starting point of the first positioning reference signal in the positioning reference signal transmission slot.

The auxiliary UE should transmit the time of receiving the positioning reference signal transmitted by the target UE to the location calculation function entity through the location calculation information fed back, and the location calculation information fed back should further include the geo-location information when the auxiliary UE receives the positioning reference signal. The location calculation function entity may be a target UE, or a base station, or a core network device transmitting a positioning reference signal.

If the location calculation function entity is the target UE that transmits the second positioning reference signal, the auxiliary UE may transmit the location calculation information fed back through the bypass carrier or the bypass resource. At this time, the location calculation information fed back should further include the identification information of the target UE; or, the location calculation information fed back is transmitted on a specific bypass carrier or bypass resource, and the specific bypass carrier or the bypass resource directly has a determined one-to-one correspondence with the target UE; or, the physical channel caring the location calculation information fed back is scrambled by the ID of the target UE, and the scrambled location calculation information fed back may ensure that only the target UE may successfully receive it; or the cyclic redundancy check code of the physical channel carrying the location calculation information fed back is scrambled by the ID of the target UE, and after scrambling, only the target UE may pass the CRC check when it is decoded.

If the location calculation function entity is a base station or a core network device, the auxiliary UE should transmit the location calculation information fed back to the location calculation function entity through the uplink carrier or the uplink resource.

It may be seen from the discussion of the fourth embodiment above: (1) The location calculation information includes at least one of the following: the time of the auxiliary positioning entity when it receives the second positioning reference signal transmitted by the target UE; the geo-location information of the auxiliary positioning entity when it receives the second positioning reference signal transmitted by the target UE; the identification information of the target UE; and the related information generated based on the identification information of the target UE. (2) Transmitting of the positioning related information includes: the auxiliary positioning entity transmits the location calculation information fed back for the positioning request information transmitted by the target UE to the target UE; or, the auxiliary positioning entity transmits the location calculation information fed back for the positioning request information transmitted by the target UE to a location calculation function entity, to transmit the location information of the target UE determined by the location calculation information by the location calculation function entity.

In addition, for implementation manner 1 of the positioning method provided in the present application, the present application also provides a corresponding positioning device. For the target UE involved in implementation manner 1, as shown in FIG. 7, it includes an auxiliary information receiving module and a geo-location determining module, wherein:

the auxiliary information receiving module is configured to receive auxiliary positioning information transmitted by an auxiliary positioning entity;

the geo-location determining module is configured to determine its own geo-location according to the received auxiliary positioning information.

Correspondingly, for the auxiliary UE involved in this implementation manner, as shown in FIG. 8, it includes a trigger condition determining module and auxiliary positioning information transmitting module, wherein:

the trigger condition determining module is configured to determine whether the condition for transmitting auxiliary positioning information is satisfied currently;

the auxiliary positioning information transmitting module is configured to transmit the auxiliary positioning information when the trigger condition is satisfied.

In addition, for implementation manner 2 of the positioning method provided in the present application, the present application also provides a corresponding positioning device. For the target UE involved in implementation manner 2, as shown in FIG. 9, it includes a trigger condition determining module and a positioning request information transmitting module, wherein:

the trigger condition determining module is configured to determine whether the condition for transmitting positioning request information is satisfied currently;

the positioning request information transmitting module is configured to transmit the positioning request information if the trigger condition is satisfied.

For the auxiliary UE involved in this implementation manner, as shown in FIG. 10, it includes a positioning request information receiving module and an information feedback module, wherein:

the positioning request information receiving module for receiving and parsing positioning request information from a target UE;

the information feedback module is configured to feed information on positioning reference signal reception timing of the target UE, geo-location information of the auxiliary UE and other information back to the location calculation function entity.

Another embodiment of the present disclosure provides a positioning device, as shown in FIG. 11, including: a detecting module 111 and a transmitting module 112.

Wherein, the detecting module 111 is configured for detecting whether the current condition of transmitting the positioning related information is satisfied by the auxiliary positioning entity; the transmitting module 112 is configured to transmit positioning related information when the condition is satisfied. The positioning related information includes any one of the following: auxiliary positioning information, location calculation information fed back for the positioning request information transmitted by the target UE.

Another embodiment of the present disclosure provides a positioning device, as shown in FIG. 12, including: a receiving module 121 and a determining module 122.

The receiving module 121 is configured to receive, by the target UE, positioning related information transmitted by the auxiliary positioning entity. The determining module 122 is configured to determine location information corresponding to the target UE based on the positioning related information. The positioning related information includes any one of the following: auxiliary positioning information, location calculation information fed back for the positioning request information transmitted by the target UE.

Another embodiment of the present disclosure provides a user equipment, including:

a processor; and a memory configured to store machine-readable instructions that, when executed by the processor, make the processor to perform the foregoing positioning method of the UE. Wherein, the user equipment includes, but is not limited to, smart terminal devices such as a vehicle, a mobile phone, a computer, and a vehicle-mounted device.

FIG. 13 schematically shows a block diagram of a computing system that may be used to implement the base station or user equipment of the present disclosure according to an embodiment of the present disclosure.

As shown in FIG. 13, the computing system 1300 includes a processor 1310, a computer-readable storage medium 1320, an output interface 1330, and an input interface 1340. The computing system 1300 may perform the method described above with reference to FIG. 1 or FIG. 4 to configure a reference signal and perform data transmission based on the reference signal.

Specifically, the processor 1310 may include, for example, a general purpose microprocessor, an instruction set processor, and/or related chip sets, and/or special purpose microprocessors (e.g., application specific integrated circuits (ASICs)), and the like. The processor 1310 may also include onboard memory for cache usage. The processor 1310 may be a single processing unit or a plurality of processing units for performing different actions of the method flow described with reference to FIG. 1 or FIG. 2.

Computer-readable storage media 1320 may be, for example, any medium that may contain, store, communicate, propagate, or transport the instructions. For example, a readable storage medium may include, but is not limited to, an electronic, magnetic, optical, electromagnetic, infrared, or semiconductor system, apparatus, device, or propagation medium. Specific examples of readable storage media include: magnetic storage devices, such as magnetic tapes or hard disks (HDDs); optical storage devices, such as compact discs (CD-ROMs); memories, such as random access memory (RAM) or flash memory; and/or wired computers/wireless communication link.

The computer readable storage medium 1320 may include a computer program, which may include code/computer executable instructions that, when executed by the processor 1310, make the processor 1310 to perform, for example, the method flows described above in connection with FIG. 1 or FIG. 2 and any deformation thereof.

The computer program may be configured with computer program code including, for example, a computer program module. For example, in an example embodiment, the code in the computer program may include one or more program modules, including, for example, module 1, module 2, It should be noted that the division manner and the number of modules are not fixed, and those skilled in the art may use suitable program modules or program module combinations according to actual scenarios, and when these program module combinations are executed by the processor 1310, the processor 1310 may perform the method flow such as that described above in connection with FIG. 1 or FIG. 2 and any variations thereof.

According to an embodiment of the present disclosure, the processor 1310 may use the output interface 1330 and the input interface 1340 to perform the method flow described above in connection with FIG. 1 or FIG. 2 and any variations thereof.

To make the objectives, technical solutions and advantages of the present invention clearer, the present invention will be further described below in details by embodiments with reference to the accompanying drawings.

Functionally, the positioning system can include an assistant positioning functional entity, a measurement functional entity and a position calculation functional entity. The assistant positioning functional entity transmits data and signals for assisting in positioning. For example, the data can include position information of the assistant positioning functional entity, information about time difference and configuration information of signals for assisting in positioning, etc.; the signals for assisting in positioning can refer to reference signals dedicated for the positioning operation or can refer to other reference signals in the system. Such other reference signals can be used for positioning. The signals for assisting in positioning are collectively called Positioning Reference Signals (PRSs) below. The position information of the assistant positioning functional entity can be known, measured or unknown. The measurement functional entity receives data for assisting in positioning from the assistant positioning functional entity and measures an associated PRS for assisting in positioning accordingly to obtain the measurements for positioning. The position calculation functional entity is used to calculate the position of a target equipment in combination with the measurements from the measurement functional entity and according to the data provided by the assistant positioning functional entity.

One equipment (a base station or other network equipments, or a UE) in the V2X system can include only a part of the above-mentioned functional entities, or one equipment can also include all of the above-mentioned functional entities. If there is limitation of the half-duplex operation, an assistant positioning entity and a measurement entity of one equipment cannot work simultaneously. The assistant positioning entity can be located in a base station or other network equipments and its position is fixed generally, so that position coordinates can be acquired accurately. The assistant positioning entity can be located in a fixed UE, for example, a RSU whose position coordinates can also be acquired accurately. The assistant positioning entity can be located in a moving UE, for example, vehicles or pedestrians. In this case, the position of the UE implementing the assistant positioning functional entity can only be acquired by other positioning methods and the positioning accuracy is restricted, for example, the positioning based on a GNSS. Due to the movement of the UE, its position information changes. Therefore, the assistant positioning entity needs to transmit data for assisting in positioning frequently to increase the positioning accuracy. For example, an assistant positioning UE contains an assistant positioning functional entity and a target UE includes a measurement functional entity and a position calculation functional entity. A UE can be served as both the assistant positioning UE and the target UE. Also, the accuracy ranges provided by different positioning methods are different. The present patent mainly provides the signal structures and resource allocation schemes related to an assistant positioning entity on the UE side.

FIG. 16 is a flowchart of a method for allocating positioning resources of the present invention, comprising the following steps.

Step 701: Data for assisting in positioning is received by a UE.

For an assistant positioning functional entity, data for assisting in positioning transmitted by the assistant positioning functional entity can include only assistant positioning information of the entity, or can include also assistant positioning information of one or more assistant positioning functional entities. The data for assisting in positioning is transmitted on randomly-selected resources. Or, the sensing can be performed within a sensing window to measure RSRP and/or a RSSI, and available resources are selected for transmitting the data for assisting in positioning according to the RSRP and/or the RSSI. The reference for measuring the RSRP can be a DMRS and/or a PRS of data resources.

Step 702: An associated PRS for assisting in positioning is received by the UE according to the data for assisting in positioning.

After the UE receives the data for assisting in positioning, associated PRS resources for assisting in positioning, including time-frequency resources and sequences or more, can be obtained according to the data for assisting in positioning to avoid the blind detection for the PRS by the UE. Time-frequency resources for one PRS can be defined as one PRS pattern and thus an index of the associated PRS pattern is obtained according to the data for assisting in positioning. Based on the sensing within a sensing window, the collision between resources for carrying data for assisting in positioning can be avoided as far as possible. When associated PRS resources are obtained according to the data for assisting in positioning, the collision between PRS resources can be avoided as far as possible. Particularly, the data for assisting in positioning has a one-to-one correspondence with its associated PRS resources.

According to resource reservation information of data for assisting in positioning, resource reservation of its associated PRS can be obtained. For example, assumed that data resources for assisting in positioning are reserved for C periods, the associated PRS for assisting in positioning is also reserved for C periods accordingly, where C is greater than or equal to 1. When the data for assisting in positioning indicates that the data resources for assisting in positioning are reserved, the associated PRS resources are also reserved accordingly. Or, assumed that the data resources for assisting in positioning are reserved for C periods, the UE can know that there are associated PRS resources within each period and the associated PRS resources for assisting in positioning are determined according to the data for assisting in positioning within each period. The associated PRS resources for assisting in positioning determined within different periods can be different to randomize the interference between PRSs.

In addition, the UE can also transmit the data for assisting in positioning after performing the measurement based on PRSs. For example, after measuring the measurements about positioning, the UE can share these measurements with other UEs. Therefore, one UE can combine the measurements of multiple UEs and the positioning accuracy can be increased. Or, one data for assisting in positioning can include information for assisting in positioning (for example, PRS configuration information, etc.) and also include the measurements about positioning obtained after measuring PRSs last time.

The data for assisting in positioning and the associated PRS for assisting in positioning can have fixed timing relationship. The UE can determine the associated PRS resources according to the data for assisting in positioning, for example, a TU, in which the associated PRS is located, is obtained according to a Time Unit (TU) that the data for assisting in positioning is located. The TU can be a subframe, a slot, a mini slot, or multiple cascaded slots, etc. A slot contains a specific number of OFDM symbols. A mini slot is shorter than a slot and can contain one or more OFDM symbols. For example, the TU in the LTE V2X system is a subframe. The data resources for assisting in positioning can be located before the associated PRS resources and can also be located after the associated PRS, or there are resources for carrying the data for assisting in positioning both before and after the associated PRS.

The data for assisting in positioning can be transmitted within one time window before the associated PRS for assisting in positioning. One UE can determine the associated PRS resources according to the data for assisting in positioning to avoid the blind detection for PRSs. The method improves the flexibility of transmitting the data for assisting in positioning. The data for assisting in positioning can be also transmitted within one time window after the associated PRS for assisting in positioning. The data for assisting in positioning can also be transmitted within one time window before the associated PRS for assisting in positioning and also within one time window after the associated PRS for assisting in positioning. For example, the data transmitted before the associated PRS indicates the associated PRS resources and the data transmitted after the associated PRS can include the measurements about positioning measured the last time.

The data for assisting in positioning and the PRS for assisting in positioning can also be independent. For example, location information of the RSU is fixed. Assumed that the data for assisting in positioning includes only the position of the RSU, the location information of the RSU doesn't need to be transmitted frequently.

The UE measures the measurements about positioning based on the data for assisting in positioning and the PRS for assisting in positioning. The UE performing the measurement operation can be a target UE, i.e. a UE which needs to determine its location; or, the UE may not be a target UE, and instead, it just provides some assistant measurement information for positioning other UEs. The specific measurements about positioning and the method for calculating the location of a target UE will not be limited in the present invention.

The present invention provides the following five specific embodiments to describe the structure of signals for positioning and the process of a method for allocating resources according to the present invention in detail.

Embodiment 5

Data resources for assisting in positioning and associated PRS resources for assisting in positioning can be allocated in periods. Within one period, an assistant positioning functional entity can transmit the data for assisting in positioning within M TUs and transmit the PRS for assisting in positioning within N TUs, where M is greater than or equal to 1 and N is greater than or equal to 1; and the TUs occupied by the data for assisting in positioning and the associated PRS for assisting in positioning can have fixed timing relationship. The timing relationship can be pre-defined, configured by a higher-layer signaling or pre-configured. For example, assumed that the data for assisting in positioning is located in the TU n, the first TU of the PRS is located in n+k, where the parameter k is pre-defined, configured or pre-configured. As shown in FIG. 17, the data for assisting in positioning is transmitted twice within one period and thus can be received by the UE in combination; the associated PRS is mapped to three TUs and transmitted to increase effective transmission power of PRSs, which is beneficial to ensuring the accuracy for the positioning measurement. Particularly, the data for assisting in positioning and the associated PRS for assisting in positioning can be located in a same TU. They can be located on different OFDM symbols in a same TU, i.e. Time Division Multiplexing (TDM); or they can occupy different subcarriers on one OFDM symbol, i.e. Frequency Division Multiplexing (FDM). In general, within one TU, transmission of the data for assisting in positioning occupies other REs except for the PRS. In addition, assumed that the UE needs to transmit the data for assisting in positioning after the measurement based on the PRS. In this case, assumed that the last TU of the PRS for assisting in positioning is located in m, the first TU of the data for assisting in positioning is located in m+j, wherein the parameter j is pre-defined, configured or pre-configured.

The resources for carrying the data for assisting in positioning and the associated PRS for assisting in positioning can be configured or pre-configured.

The first method is to configure resources for carrying the data for assisting in positioning and the associated PRS for assisting in positioning based on a physical index of a TU. For example, the configuration information of the resources can include: periods, offsets of a starting TU within one period and occupied TUs. The occupied TUs can be consecutive or inconsecutive. By this method, the resources for carrying the data for assisting in positioning and the associated PRS for assisting in positioning are strictly periodic. The method is equivalent to configure a resource pool for the resources for carrying the data for assisting in positioning and the associated PRS for assisting in positioning based on a physical index of a TU. Therefore, based on a physical index of a TU, the resources for carrying the data for assisting in positioning and the associated PRS for assisting in positioning can also be configured by using the method of configuring a resource pool. Other V2X resource pools can also be defined based on a physical index of a TU. The resource pool for positioning and other V2X resource pools can be non-overlapped, partly-overlapped or completely-overlapped. In the LTE V2X system, the V2X resource pool is defined based on the logical subframe. If a similar mechanism is maintained, i.e. on one carrier, a logic TU index is defined after removing a part of TUs and then a resource pool is configured based on the logic TU index. Similar to LTE V2X, the removed TUs can include TUs for synchronous channels and downlink TUs or more. In order to configure the V2X resource pool, the removed TUs can also include the TUs for carrying the data for assisting in positioning and the associated PRS for assisting in positioning.

The second method is to configure resources for carrying the data for assisting in positioning and the associated PRS for assisting in positioning based on a logic index of a TU. For example, the configuration information of the resources can include: periods, offsets of a starting TU within one period and occupied TUs. The occupied TUs can be consecutive or inconsecutive. It is assumed that the mechanism in which a resource pool is defined based on the logical subframe in the LTE V2X system is maintained. On one carrier, a logic TU index is defined after removing a part of TUs and then a resource pool is defined based on the logic TU index. Similar to LTE V2X, the removed TUs can include TUs for synchronous channels and downlink TUs or more. The method is actually to configure a resource pool for the resources for carrying the data for assisting in positioning and the associated PRS for assisting in positioning based on a logic index of a TU. Therefore, based on a logic index of a TU, the resources for carrying the data for assisting in positioning and the associated PRS for assisting in positioning can also be configured by using a method of configuring a resource pool. The resource pool for positioning and other V2X resource pools can be non-overlapped, partly-overlapped or completely-overlapped. Compared to the first method, the resources for carrying the data for assisting in positioning and the associated PRS for assisting in positioning, allocated by the second method, may not be strictly periodic due to the influence of the removed TUs.

The resources for carrying the data for assisting in positioning and the associated PRS for assisting in positioning can be configured or pre-configured, respectively. Or, the resources for carrying the data for assisting in positioning and the associated PRS for assisting in positioning can share a same period and offset parameter, and the data resources and the associated PRS resources in one period are further distinguished by using other methods or parameters.

For one UE, the associated PRS resources, including PRS time-frequency resources and PRS sequences, can be indicated by the data for assisting in positioning. For example, the data for assisting in positioning contains the information field for determining the associated PRS resources, or a part of information fields of the data for assisting in positioning is reused to determine the associated PRS resources. Particularly, the associated PRS resources can be determined by Cyclic Redundancy Check (CRC) of the data for assisting in positioning. Or, associated PRS resources and PRS sequences can also be obtained implicitly according to the resources for carrying the data for assisting in positioning. For example, the PRS time-frequency resources and the PRS sequences are determined according to the position of the resources for carrying the data for assisting in positioning, including a PRB index, a sub-channel index and/or a TU index, etc. By this method, different time-frequency resources for carrying the data for assisting in positioning can be mapped to different PRS time-frequency resources and PRS sequences as far as possible, so that it is beneficial to reducing the interference between PRSs. Or, associated PRS time-frequency resources are obtained implicitly according to the resources for carrying the data for assisting in positioning, and the data for assisting in positioning indicates associated PRS sequences. By this method, different time-frequency resources for carrying the data for assisting in positioning can be mapped to different PRS time-frequency resources as far as possible, so that it is beneficial to reducing the interference between PRSs. Also, when PRS time-frequency resources collide, randomized interference can be further performed according to the PRS sequences indicated by the data for assisting in positioning. By this method, the associated PRS resources for assisting in positioning are obtained according to the data for assisting in positioning to avoid the blind detection for the PRS by the UE.

When the data for assisting in positioning and the associated PRS for assisting in positioning need to be transmitted, the UE can select data resources randomly from the resources for carrying the data for assisting in positioning. The PRS resources can also be selected randomly or determined implicitly according to the data resources. The randomly-selected resources can be used within only one period or can also be used consecutively for several periods. Or, the UE can also sense signals from other UEs on the resources for carrying the data and PRS for assisting in positioning, to select resources which are not occupied by other UEs and avoid the collision with the data and PRS for assisting in positioning from other UEs. For example, similar to LTE V2X, RSRP and/or an RSSI of the resources for carrying the data for assisting in positioning of other UEs are measured within one sensing window and available data resources are selected to transmit the data for assisting in positioning. The PRS resources can be selected randomly or determined implicitly according to the data resources. Or, within one sensing window, the UE can measure the RSRP and/or the RSSI of PRSs for other UEs to select available PRS resources. When the PRS resources are selectively obtained based on the sensing result of the PRS resources within the sensing window, the data resources for assisting in positioning can be selected randomly, or be determined implicitly according to the PRS resources or be selectively obtained based on the sensing result of the data resources within the sensing window. Or, within one sensing window, the UE can both measure the RSRP and/or the RSSI of data resources for other UEs, and measure the RSRP and/or the RSSI of PRSs for other UEs, so that available data resources and associated PRS resources are selected on the basis of combinations thereof. Assumed that the data resources for assisting in positioning are reserved for several periods, the associated PRS resources are also reserved within each period in which the data resources for assisting in positioning are reserved. Or, assumed that the data resources for assisting in positioning are reserved for several periods, the UE can know that there are associated PRS resources within each period, but the actual PRS resources need to be determined according to the data for assisting in positioning within each period. Whether the data and/or the associated PRS for assisting in positioning is actually transmitted within one period also depends upon a muting pattern of the PRS.

Embodiment 6

PRS resources for assisting in positioning can be allocated in periods. Within one period, an assistant positioning functional entity transmits the data for assisting in positioning within one window before the associated PRS resources. The number of TUs of the window can be pre-defined, configured or pre-configured. As shown in FIG. 18, the data for assisting in positioning is transmitted twice within a window of the data for assisting in positioning before the associated PRS resources and thus can be received by the UE in combination; the PRS is mapped to 3 TUs and transmitted to increase effective transmission power of PRSs, which is beneficial to ensuring the accuracy for the positioning measurement. Or, the data for assisting in positioning can be also transmitted within one time window after the associated PRS for assisting in positioning. Or, the data for assisting in positioning can also be transmitted within one time window A before the associated PRS for assisting in positioning and also within one time window B after the associated PRS for assisting in positioning.

The resources for carrying the PRS for assisting in positioning can be configured or pre-configured. The resources for carrying the data for assisting in positioning can share a same resource pool with other V2X transmission, or the resource pool for the resources for carrying the data for assisting in positioning is configured or preconfigured.

The first method is to configure resources for carrying the PRS for assisting in positioning based on a physical index of a TU. For example, the configuration information of the resources can include: periods, offsets of a starting TU within one period and occupied TUs. The occupied TUs can be consecutive or inconsecutive. By this method, the resources for carrying the PRS for assisting in positioning are strictly periodic. The method is equivalent to configure a resource pool for the resources for carrying the PRS for assisting in positioning based on a physical index of a TU. Therefore, based on a physical index of a TU, the resources for carrying the data for assisting in positioning and the associated PRS for assisting in positioning can also be configured by the method of configuring a resource pool. Meanwhile, based on a physical index of a TU, another V2X resource pool can be configured to carry the data for assisting in positioning and the same V2X resources pool are also used for V2X communication. The resource pool for assisting in positioning and other V2X resource pools can be non-overlapped, partly-overlapped or completely-overlapped. By this method, it is easier to ensure that there are resources available for transmitting the data for assisting in positioning within one window before the associated PRS resources, because the resources for carrying both the data and the associated PRS are configured based on a physical index of a TU.

In the LTE V2X system, the V2X resource pool is defined based on the logical subframe. If a similar mechanism is maintained, i.e. on one carrier, a logic TU index is defined after removing a part of TUs and then a resource pool is configured based on the logic TU index, such a resource pool is used to carry the data for assisting in positioning and the same V2X resources are also used for V2X communication. The resource pool for carrying data for assisting in positioning and other V2X resource pools can be non-overlapped, partly-overlapped or completely-overlapped. Here, though the V2X resource pool is based on the logic index of the TU and the PRS resources are based on the physical index of the TU, by rational configuration, it can still ensure that there are resources available for transmitting the data for assisting in positioning within one window before the PRS resources. Similar to LTE V2X, the removed TUs can include TUs for synchronous channels and downlink TUs or more. In order to configure the V2X resource pool, the removed TUs can also include the TUs for carrying the data for assisting in positioning and the associated PRS for assisting in positioning.

The second method is to configure resources for carrying the PRS for assisting in positioning based on a logic index of a TU. For example, the configuration information of the resources can include: periods, offsets of a starting TU within one period and occupied TUs. The occupied TUs can be consecutive or inconsecutive. It is assumed that the mechanism in which a resource pool is defined based on the logical subframe in the LTE V2X system is maintained. On one carrier, a logic TU index is defined after removing a part of TUs and then a resource pool is defined based on the logic TU index. Similar to LTE V2X, the removed TUs can include TUs for synchronous channels and downlink TUs or more. The method is actually to configure a resource pool for the resources for carrying the PRS for assisting in positioning based on a logic index of a TU. Therefore, based on a logic index of a TU, the resources for carrying the data for assisting in positioning and the associated PRS for assisting in positioning can also be configured by the method of configuring a resource pool. Meanwhile, based on a logic index of a TU, another V2X resource pool can be configured to carry the data for assisting in positioning and the same V2X resources are also used for V2X communication. The resource pool for positioning and other V2X resource pools can be non-overlapped, partly-overlapped or completely-overlapped. Compared to the first method, the resources for carrying the data and PRS for assisting in positioning, allocated by the second method, may not be strictly periodic due to the influence of the removed TUs.

For a UE, the associated PRS resources, including PRS time-frequency resources and PRS sequences, can be indicated by the data for assisting in positioning. For example, the data for assisting in positioning contains the information field for determining the associated PRS resources, or a part of information fields of the data for assisting in positioning is reused to determine the associated PRS resources. Particularly, the associated PRS resources can be determined by CRC of the data for assisting in positioning. Or, associated PRS resources and PRS sequences can also be obtained implicitly according to the resources for carrying the data for assisting in positioning. For example, the PRS time-frequency resources and the PRS sequences are determined according to the position of the resources for carrying the data for assisting in positioning, including a PRB index, a sub-channel index and/or a TU index, etc. By this method, different time-frequency resources for carrying the data for assisting in positioning can be mapped to different PRS time-frequency resources and PRS sequences as far as possible, so that it is beneficial to reducing the interference between PRSs. Or, associated PRS time-frequency resources are obtained implicitly according to the resources for carrying the data for assisting in positioning, and the data for assisting in positioning indicates associated PRS sequences. By this method, different time-frequency resources for carrying the data for assisting in positioning can be mapped to different PRS time-frequency resources as far as possible, so that it is beneficial to reducing the interference between PRSs. Also, when PRS time-frequency resources collide, randomized interference can be further performed according to the PRS sequences indicated by the data for assisting in positioning. By this method, the associated PRS resources for assisting in positioning are obtained according to the data for assisting in positioning to avoid the blind detection for the PRS by the UE.

When the data for assisting in positioning and the associated PRS for assisting in positioning need to be transmitted, the UE can select data resources randomly from the resource pool for carrying the data for assisting in positioning. The PRS resources can be selected randomly or determined implicitly according to the data resources. The randomly-selected resources can be used within only one PRS period or can also be used consecutively for several periods. Or, the UE can also sense signals from other UEs on the resource pool for carrying the data and PRS for assisting in positioning to select resources which are not occupied by other UEs and avoid the collision with the data and PRS for assisting in positioning from other UEs. For example, similar to LTE V2X, RSRP and/or an RSSI of the resources for carrying the data for assisting in positioning from other UEs are measured within one sensing window and available data resources are selected to transmit the data for assisting in positioning. The PRS resources can be selected randomly or determined implicitly according to the data resources. Or, within one sensing window, based on the data for assisting in positioning from other UEs sensed by the resource pool for carrying the data for assisting in positioning, the UE can measure the RSRP and/or the RSSI of PRSs for other UEs to select available PRS resources. Assumed that the data resources for assisting in positioning are reserved for several periods, the associated PRS resources are also reserved within each period in which the data resources for assisting in positioning are reserved. Or, assumed that the data resources for assisting in positioning are reserved for several periods, the UE can know that there are associated PRS resources within each period, but the actual PRS resources need to be determined according to the data for assisting in positioning within each period. Whether the data and/or the associated PRS for assisting in positioning is actually transmitted within one period also depends upon a muting pattern of the PRSs.

Embodiment 7

The resources for carrying the data for assisting in positioning and the associated PRS for assisting in positioning can be configured or pre-configured and can share a same resource pool with other V2X transmission. The data for assisting in positioning can be also transmitted within one time window before the associated PRS for assisting in positioning. Or, the data for assisting in positioning can be also transmitted within one time window after the associated PRS for assisting in positioning. Or, the data for assisting in positioning can also be transmitted within one time window before the associated PRS for assisting in positioning and also within one time window after the PRS for assisting in positioning. Particularly, the data for assisting in positioning and the associated PRS for assisting in positioning can be located in a same TU and can be located on different OFDM symbols in a same TU, i.e. Time Division Multiplexing (TDM); or they can occupy different subcarriers on one OFDM symbol, i.e. Frequency Division Multiplexing (FDM). In general, within one TU, transmission of the data for assisting in positioning occupies other REs except for the PRS.

The first method is to configure a resource pool for carrying the data for assisting in positioning and the associated PRS for assisting in positioning based on a physical index of a TU. The same resource pool can also be used for V2X communication. By this method, the resources for carrying the data for assisting in positioning and the associated PRS for assisting in positioning are strictly periodic. The resource pool for positioning and other V2X resource pools can be non-overlapped, partly-overlapped or completely-overlapped.

The second method is to configure a resource pool for carrying the data for assisting in positioning and the associated PRS for assisting in positioning based on a logic index of a TU. The same resource pool can also be used for V2X communication. It is assumed that the mechanism in which a resource pool is defined based on the logical subframe in the LTE V2X system is maintained. On one carrier, a logic TU index is defined after removing a part of TUs and then a resource pool is defined based on the logic TU index. Similar to LTE V2X, the removed TUs can include TUs for synchronous channels and downlink TUs or more. The resource pool for positioning and other V2X resource pools can be non-overlapped, partly-overlapped or completely-overlapped. Compared to the first method, the resources for carrying the data for assisting in positioning and the associated PRS for assisting in positioning, allocated by the second method, may not be strictly periodic due to the influence of the removed TUs.

For a UE, the associated PRS resources, including PRS time-frequency resources and PRS sequences, can be indicated by the data for assisting in positioning. For example, the data for assisting in positioning contains information field for determining the associated PRS resources, or a part of information fields of the data for assisting in positioning is reused to determine the associated PRS resources. Particularly, the associated PRS resources can be determined by CRC of the data for assisting in positioning. Or, associated PRS resources and PRS sequences can also be obtained implicitly according to the resources for carrying the data for assisting in positioning. For example, the associated PRS time-frequency resources and the PRS sequences are determined according to the position of the resources for carrying the data for assisting in positioning, including a PRB index, a sub-channel index and/or a TU index, etc. By this method, different time-frequency resources for carrying the data for assisting in positioning can be mapped to different PRS time-frequency resources and PRS sequences as far as possible, so that it is beneficial to reducing the interference between PRSs. Or, associated PRS time-frequency resources are obtained implicitly according to the resources for carrying the data for assisting in positioning, and the data for assisting in positioning indicates associated PRS sequences. By this method, different time-frequency resources for carrying the data for assisting in positioning can be mapped to different PRS time-frequency resources as far as possible, so that it is beneficial to reducing the interference between PRSs. Also, when PRS time-frequency resources collide, randomized interference can be further performed according to the PRS sequences indicated by the data for assisting in positioning. By this method, the associated PRS resources for assisting in positioning are obtained according to the data for assisting in positioning to avoid the blind detection for the PRS by the UE.

When the data for assisting in positioning and the associated PRS for assisting in positioning need to be transmitted, the UE can select data resources randomly from the resource pool for carrying the data for assisting in positioning. The PRS resources can be selected randomly or determined implicitly according to the data resources. The randomly-selected resources can be used within only one PRS period or can also be used consecutively for several periods. Or, the UE can also sense signals from other UEs on the resource pool for carrying the data and PRS for assisting in positioning, to select resources which are not occupied by other UEs and avoid the collision with the data and PRS for assisting in positioning from other UEs. For example, similar to LTE V2X, RSRP and/or an RSSI of the resources for carrying the data for assisting in positioning from other UEs are measured within one sensing window and available data resources are selected to transmit the data for assisting in positioning. The PRS resources can be selected randomly or determined implicitly according to the data resources. Or, within one sensing window, based on the data for assisting in positioning from other UEs sensed on the resource pool for carrying the data for assisting in positioning, the UE can measure the RSRP and/or the RSSI of PRSs for other UEs to select available PRS resources.

In this method, a problem to be considered is to avoid the collision between the PRS and data transmission from other UEs. Within one TU, the data and the PRS can be time-divided. For example, the PRS occupies the last OFDM symbol of the TU and other OFDM symbols are used for transmitting the data. For a UE performing V2X communication, the influence on the PRS can be avoided preferentially during the selection of resources. If the UE detects the data for assisting in positioning, the UE removes all candidate resources in the TU in which the PRS indicated by the data for assisting in positioning is located. Or, if the UE detects the data for assisting in positioning and RSRP of a data channel exceeds a specific threshold, the UE removes all candidate resources in the TU in which the PRS indicated by the data for assisting in positioning is located. Or, if the UE detects the data for assisting in positioning and RSRP of the PRS indicated by the data exceeds a specific threshold, the UE removes all candidate resources in the TU in which the PRS indicated by the data for assisting in positioning is located. If the UE detects the data for assisting in positioning, the UE removes all candidate resources, which are collided with the PRS, in the TU in which the PRS indicated by the data for assisting in positioning is located. Or, if the UE detects the data for assisting in positioning and RSRP of a data channel exceeds a specific threshold, the UE removes all candidate resources, which are collided with the PRS, in the TU in which the PRS indicated by the data for assisting in positioning is located. Or, if the UE detects the data for assisting in positioning and RSRP of the PRS indicated by the data exceeds a specific threshold, the UE removes all candidate resources, which are collided with the PRS, in the TU in which the PRS indicated by the data for assisting in positioning is located. Assumed that the data resources for assisting in positioning are reserved for several periods, the associated PRS resources are also reserved within each period in which the data resources for assisting in positioning are reserved. Or, assumed that the data resources for assisting in positioning are reserved for several periods, the UE can know that there are associated PRS resources within each period, but the actual PRS resources need to be determined according to the data for assisting in positioning within each period. Whether the data and/or the associated PRS for assisting in positioning is actually transmitted within one period also depends upon a muting pattern of the PRS.

Embodiment 8

A UE, whose position is fixed, can process the data for assisting in positioning and the associated PRS for assisting in positioning by methods of Embodiment 5, Embodiment 6 and/or Embodiment 7. Or, for a fixed UE, for example, an RSU, its position information doesn't change, so the related data for assisting in positioning may not be transmitted along with the PRS for assisting in positioning. A fixed UE can transmit only its assistant positioning information, or can transmit also assistant positioning information of one or more fixed UEs. PRS resources for assisting in positioning can be allocated in periods. The resources for carrying the PRS for assisting in positioning can be configured or pre-configured. For the fixed UE, the resources for the PRS can be obtained according to a UE ID and/or other parameters, to reduce the blind detection for the PRS by the UE. Or, for the fixed UE, the resources for the PRS can be pre-defined, configured or pre-configured. Space for the PRS resources (including time-frequency resources and/or PRS sequences) for the fixed UE and space for the PRS resources for other moving UEs can be configured or pre-configured, respectively. In general, by distributing networks rationally, the fixed UE can use orthogonal PRS resources as far as possible to reduce the interference; however, for a moving UE, it is more difficult to avoid the interference between PRSs for the UE due to the change in its position. When spaces for the PRS resources are different, the collision between the PRS resources for a moving UE and the PRS resources for a fixed UE can be avoided, for fear of interference.

The first method is to configure resources for carrying the PRS for assisting in positioning based on a physical index of a TU. For example, the configuration information of the resources can include: periods, offsets of a starting TU within one period and occupied TUs. The occupied TUs can be consecutive or inconsecutive. By this method, the resources for carrying the PRS for assisting in positioning are strictly periodic. The method is equivalent to configure a resource pool for the resources for carrying the PRS for assisting in positioning based on a physical index of a TU. Therefore, based on a physical index of a TU, the resources for carrying the PRS for assisting in positioning can also be configured by a method of configuring a resource pool.

The second method is to configure resources for carrying the PRS for assisting in positioning based on a logic index of a TU. For example, the configuration information of the resources can include: periods, offsets of a starting TU within one period and occupied TUs. The occupied TUs can be consecutive or inconsecutive. It is assumed that the mechanism in which a resource pool is defined based on the logical subframe in the LTE V2X system is maintained. On one carrier, a logic TU index is defined after removing a part of TUs and then a resource pool is defined based on the logic TU index. Similar to LTE V2X, the removed TUs can include TUs for synchronous channels and downlink TUs or more. The method is actually to configure a resource pool for the resources for carrying the PRS for assisting in positioning based on a logic index of a TU. Therefore, based on a logic index of a TU, the resources for carrying the PRS for assisting in positioning can also be configured by a method of configuring a resource pool.

Embodiment 9

In order to improve the accuracy of the measurement based on the PRS, several PRS patterns can be defined within one TU. The several PRS patterns can be distinguished by TDM and/or FDM and thus resources are orthogonal. For example, in the LTE system, 6 PRS patterns are defined based on 6 frequency offsets within one subframe. However, PRS orthogonal patterns, which can be supported within one TU, are limited.

After an assistant positioning functional entity selects the data for assisting in positioning, the data can be reserved consecutively for C periods, wherein C is a positive integer. The associated PRS resources can be reserved for C periods, or the associated PRS resources within each period need to be determined according to the data for assisting in positioning within this period. Within one period, the data for assisting in positioning can occupy one or more TUs, and the associated PRS for assisting in positioning can also occupy one or more TUs. The data and the associated PRS for assisting in positioning can be located in a same TU or different TUs. After C periods are occupied consecutively, the assistant positioning functional entity reselects the data for assisting in positioning and determines the associated PRS resources accordingly. In order to further reduce the interference between PRSs, a part of assistant positioning functional entities can stop transmitting the data and/or the associated PRS for assisting in positioning within some periods, while other assistant positioning entities still transmit the data for assisting in positioning and the associated PRS for assisting in positioning. In this way, the number of PRS patterns is increased and the detection performance for the PRS is improved.

The first method is to define a muting pattern in the time domain to further increase the number of the PRS patterns. Each bit of the muting pattern can indicate whether the data for assisting in positioning and the associated PRS for assisting in positioning need to be transmitted within one period. For example, a bitmap of the muting pattern is denoted as $(b_0, b_1, \ldots, b_{L_{bitmap}-1})$, wherein $L_{bitmap}$ is the length of the bitmap. When $b_{k'}=1$ and k'=k mod $L_{bitmap}$, the transmission of the data for assisting in positioning and the associated PRS for assisting in positioning is stopped within the kth period. Or, each bit of the muting pattern can indicate whether the PRS for assisting in positioning needs to be transmitted within one period, but the data for assisting in positioning is always transmitted. For example, when $b_{k'}=1$ and k'=k mod $L_{bitmap}$, the transmission of the PRS for assisting in positioning is stopped within the kth period, but the data for assisting in positioning is still transmitted. In doing so, the data is transmitted within each period while the PRS detection performance is improved, so that data resources can be occupied better and the resources are prevented from being occupied by other UEs for fear of the collision.

The second method is that an assistant positioning functional entity randomly determines whether the data for assisting in positioning and the associated PRS for assisting in positioning need to be transmitted within one period. The ratio of the periods, in which the transmission of the data for assisting in positioning and the associated PRS for assisting in positioning is stopped randomly, can be pre-defined, configured or pre-configured. The data for assisting in positioning, the transmission of which is stopped randomly, shall not trigger the reselection of the data resources. Or, an assistant positioning functional entity randomly determines whether the PRS for assisting in positioning needs to be transmitted within one period, but the data for assisting in positioning is always transmitted. The ratio of the periods, in which the transmission of the PRS for assisting in positioning is stopped randomly, can be predefined, configured or pre-configured. In doing so, the data is transmitted within each period while the PRS detection performance is improved, so that data resources can be occupied better and the resources are prevented from being occupied by other UEs for fear of the collision.

In fact, within one period, the PRS for assisting in positioning can occupy more TUs for transmission. In order to further reduce the interference between the PRSs, a part of assistant positioning functional entities can stop the transmission of the PRS on a part of TUs used for the PRS within one period, while other assistant positioning entities still transmit the PRS for assisting in positioning to increase the number of PRS patterns and the detection performance of the PRS is improved.

The third method is to apply the muting pattern on multiple TUs, in which the PRS can be transmitted, within one period to increase the number of PRS patterns. Within each period, the data for assisting in positioning is always transmitted and resources for carrying the data for assisting in positioning are the same. In doing so, the data is transmitted within each period, so that data resources can be occupied better and the resources are prevented from being occupied by other UEs for fear of the collision. However, corresponding to one PRS pattern, its PRS muting pattern within each period can be different. A bitmap of the muting pattern applied in the TUs, in which the PRS can be transmitted, within one period is noted as $(b'_0, b'_1, \ldots, b'_L)$, wherein L is the length of the bitmap. When $b_{k'}=1$ and $k'=k \bmod L_{bitmap}$, the transmission of the PRS is stopped in the kth TU, in which the PRS can be carried, within one period. The third method can be used in combination with the first method or the second method to obtain more PRS patterns.

The fourth method is that an assistant positioning functional entity randomly determines whether the PRS needs to be transmitted in one TU, in which the PRS can be carried, within one period. The ratio of the TUs, in which the transmission of the PRS is stopped randomly, can be pre-defined, configured or pre-configured. Within each period, the data for assisting in positioning is always transmitted and resources for carrying the data for assisting in positioning are the same. In doing so, the data is transmitted within each period, so that data resources can be occupied better and the resources are prevented from being occupied by other UEs for fear of the collision. The fourth method can be used in combination with the first method or the second method to obtain more PRS patterns.

Corresponding to the method described above, the present application also discloses an equipment which can be used for implementing the method described above, as shown in FIG. 19, comprising an assistant positioning data module and an assistant positioning PRS module, wherein:

the assistant positioning data module is configured to receive data for assisting in positioning; and the assistant positioning PRS module is configured to receive, according to the data for assisting in positioning, an associated PRS for assisting in positioning.

It can be understood by a person of ordinary skill in the art that all of or a part of steps in the embodiment methods can be implemented by instructing related hardware by programs. The programs can be stored in a computer-readable storage medium, and, when executed, include one or a combination of the steps of the method embodiments.

In addition, each functional unit in each embodiment of the present application can be integrated into a processing module; or, each unit can exist alone physically; or, two or more units can be integrated into one module. The integrated module can be implemented in the form of hardware, or can be implemented in the form of a software functional module. If the integrated module is implemented in the form of a software functional module and sold or used as an independent product, the integrated module can also be stored in a computer-readable storage medium.

The storage medium mentioned above can be a read-only memory, a magnetic disk, an optical disk, etc.

The forgoing description merely shows preferred embodiments of the present application and is not intended to limit the present application. Any modification, equivalent replacement or improvement made within the spirit and principle of the present application shall fall into the protection scope of the present application.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by those skilled in the art that the present disclosure involves devices for carrying out one or more of operations as described in the present disclosure. Those devices may be specially designed and manufactured as intended, or may include well known devices in a general-purpose computer. Those devices have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media include any media storing or transmitting information in a device (for example, computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the present disclosure may be alternated, changed, combined or deleted. Further, other steps, measures and solutions in the operations, methods and flows already discussed in the present disclosure may also be alternated, changed, rearranged, decomposed, combined or deleted. Further, the steps, measures and solutions of the prior art in the operations, methods and operations disclosed in the present disclosure may also be alternated, changed, rearranged, decomposed, combined or deleted.

The foregoing descriptions are merely some implementations of the present disclosure. It should be noted that, to a person of ordinary skill in the art, various improvements and modifications may be made without departing from the principle of the present disclosure, and these improvements and modifications should be regarded as falling into the protection scope of the present disclosure.

The invention claimed is:

1. A method for positioning user equipment (UE), the positioning method comprising:

detecting, by an auxiliary positioning entity, whether a condition of transmitting positioning related information associated with the auxiliary positioning entity is currently satisfied; and transmitting, to a target UE, the positioning related information associated with the auxiliary positioning entity, in case that the condition is satisfied, wherein the positioning related information comprises any one of auxiliary positioning information, or location calculation information fed back for positioning request information transmitted by the target UE, and wherein the condition of transmitting positioning related information comprises any one of the following:
 a Global Navigation Satellite System (GNSS) signal being detected by the auxiliary positioning entity;
 indication information of a base station being received by the auxiliary positioning entity;
 a current movement speed of the auxiliary positioning entity being zero:
 a type of the auxiliary positioning entity being a base station type Road Side Unit (RSU);
 a number of other auxiliary positioning entities currently detected by the auxiliary positioning entity being smaller than a first preset threshold; and
 a distance between the auxiliary positioning entity and other currently detected auxiliary positioning entities being greater than a second preset threshold.

2. The positioning method for UE according to claim 1, wherein, the auxiliary positioning entity comprises any one of the following:
 the base station, a UE, a base station type Road Side Unit (RSU) and a UE type RSU,
wherein the auxiliary positioning information comprises at least one of the following:
 a first positioning reference signal, geo-location information of the auxiliary positioning entity, and timing information of the auxiliary positioning entity transmitting the first positioning reference signal, and
wherein the auxiliary positioning entity acquires its own geo-location information, when the positioning related information comprises the auxiliary positioning information.

3. The positioning method for UE according to claim 1, wherein, the step of transmitting positioning related information comprises any one of the following scenarios:
 determining a system frame number and a slot number for transmitting positioning related information based on an acquired first preset Universal Time Coordinated (UTC) reference time point, and transmitting the positioning related information on a first slot position determined by the system frame number and the slot number;
 determining the system frame number and the slot number for transmitting the positioning related information based on a received timing information of a base station or a base station type RSU or a UE type RSU, and transmitting the positioning related information on a second slot position determined by the system frame number and the slot number;
 determining a starting point of the slot for transmitting the positioning related information based on at least one of the following items, and transmitting the positioning related information on a third time slot position determined by the starting point of the slot:
 the received timing information of the base station;
 the received timing information of the base station type RSU;
 the received timing information of the UE type RSU; and
 a timing advance of the auxiliary positioning information.

4. The positioning method for UE according to claim 3, wherein, the step of determining the system frame number and the slot number for transmitting positioning related information based on the acquired first preset UTC reference time point of UTC comprises:
 determining the system frame number and the slot number of a first positioning reference signal included in the positioning related information based on the first preset UTC reference time point, and
wherein the step of determining the system frame number and the slot number for transmitting positioning related information based on the received timing information of the base station or the base station type RSU or the UE type RSU comprises:
 determining the system frame number and the slot number of a data message included in the positioning related information, based on the received timing information of the base station or the base station type RSU or the UE type RSU.

5. The positioning method for UE according to claim 2, wherein, the step of transmitting positioning related information comprises any one of the following scenarios:
 determining a system frame number and a slot number for transmitting positioning related information based on an acquired first preset Universal Time Coordinated (UTC) reference time point, and transmitting the positioning related information on a first slot position determined by the system frame number and the slot number;
 determining the system frame number and the slot number for transmitting the positioning related information based on a received timing information of the base station or the base station type RSU or the UE type RSU, and transmitting the positioning related information on a second slot position determined by the system frame number and the slot number;
 determining a starting point of the slot for transmitting the positioning related information based on at least one of the following items, and transmitting the positioning related information on a third time slot position determined by the starting point of the slot:
 the received timing information of the base station;
 the received timing information of the base station type RSU;
 the received timing information of the UE type RSU; and
 a timing advance of the auxiliary positioning information.

6. A method for positioning user equipment (UE), the positioning method comprising:
 receiving, by a target UE, positioning related information associated with an auxiliary positioning entity from the auxiliary positioning entity; and
 determining location information corresponding to the target UE based on the positioning related information associated with the auxiliary positioning entity,
wherein the positioning related information comprises any one of auxiliary positioning information, or location calculation information fed back for positioning request information transmitted by the target UE, and
wherein, when the positioning related information comprises the auxiliary positioning information transmitted by the auxiliary positioning entity, the step of determining the location information corresponding to the target UE based on the positioning related information comprises:

determining an Observed Time Difference of Arrival (OTDOA) according to the time of receiving first positioning reference signals respectively transmitted by the plurality of auxiliary positioning entities; and determining the location information corresponding to the target UE according to the OTDOA and geo-location information of the plurality of auxiliary positioning entities.

7. The positioning method for UE according to claim 6, wherein, the auxiliary positioning entity comprises any one of the following:

a base station, a UE, a base station type Road Side Unit (RSU) and a UE type RSU, and wherein the auxiliary positioning information comprises at least one of the following:

a first positioning reference signal, geo-location information of the auxiliary positioning entity, and timing information of the first positioning reference signal transmitted by the auxiliary positioning entity.

8. The positioning method for UE according to claim 6, wherein, the step of determining the OTDOA according to the time of receiving the first positioning reference signals respectively transmitted by the plurality of auxiliary positioning entities comprises any one of the following scenarios:

determining the OTDOA according to the time of receiving a plurality of first positioning reference signals and a length of a current carrier slot, when the plurality of auxiliary positioning information each does not comprise quantization granularity deviation and quantization period deviation, wherein the quantization granularity deviation are quantization granularity deviation of timing information of the auxiliary positioning entity transmitting a first positioning reference signal relative to a second preset 1UTC reference time point, wherein the quantization period deviation are quantization period deviation of the timing information of the auxiliary positioning entity transmitting the first positioning reference signal relative to the second preset 1UTC reference time point;

determining the OTDOA, according to the time of receiving the plurality of first positioning reference signals, the length of the current carrier slot and a plurality of quantization granularity deviation, when the plurality of auxiliary positioning information each comprises the quantization granularity deviation, or each comprises the quantization granularity deviation and the quantization period deviation and each quantization period deviation is equal to each other;

determining the OTDOA, according to the time of receiving the first positioning reference signal of the auxiliary positioning entity with the smallest quantization granularity, the time of receiving the first positioning reference signal of the auxiliary positioning entity with the largest quantization granularity, the length of the current carrier slot and the minimum and the maximum of the plurality of quantization granularity deviation, when the plurality of auxiliary positioning information each comprises the quantization granularity deviation and the quantization period deviation and each quantization period deviation is not equal; and determining the OTDOA according to the time of receiving the plurality of the first positioning reference signals, the length of the current carrier slot and the quantization granularity deviation, when any one of the following conditions is satisfied:

at least one of the plurality of the auxiliary positioning information comprises the quantization granularity deviation and the quantization period deviation, and other auxiliary positioning information do not comprise the quantization granularity deviation and the quantization period deviation;

at least one of the plurality of the auxiliary positioning information comprises the quantization granularity deviation but does not comprise the quantization period deviation, and other auxiliary positioning information do not comprise the quantization granularity deviation and the quantization period deviation, and wherein, the step of determining the location information corresponding to the target UE according to the geo-location information of the plurality of auxiliary positioning entities and the OTDOA comprises:

reporting identification information of the plurality of auxiliary positioning entities and the OTDOA to location calculation function entity, and receiving feedback information of the location calculation function entity; and determining the location information corresponding to the target UE, according to the received feedback information.

9. A positioning device, comprising:

a transmitter; and at least one processor, wherein the at least one processor is configured to detect whether a condition of transmitting positioning related information associated with an auxiliary positioning entity is satisfied by the auxiliary positioning entity, wherein the transmitter is configured to transmit the positioning related information associated with the auxiliary positioning entity to a target UE when the condition is satisfied, and wherein the positioning related information comprising any one of auxiliary positioning information, or location calculation information fed back for positioning request information transmitted by the target UE, and wherein the condition of transmitting positioning related information comprises any one of the following:

a Global Navigation Satellite System (GNSS) signal being detected by the auxiliary positioning entity;

indication information of a base station being received by the auxiliary positioning entity;

a current movement speed of the auxiliary positioning entity being zero:

a type of the auxiliary positioning entity being a base station type Road Side Unit (RSU);

a number of other auxiliary positioning entities currently detected by the auxiliary positioning entity being smaller than a first preset threshold; and a distance between the auxiliary positioning entity and other currently detected auxiliary positioning entities being greater than a second preset threshold.

10. The positioning device of claim 9, wherein, the auxiliary positioning entity comprises any one of the following:

the base station, a UE, a base station type Road Side Unit (RSU) and a UE type RSU, wherein the auxiliary positioning information comprises at least one of the following:
- a first positioning reference signal, geo-location information of the auxiliary positioning entity, and timing information of the auxiliary positioning entity transmitting the first positioning reference signal, and wherein the auxiliary positioning entity acquires its own geo-location information, when the positioning related information comprises the auxiliary positioning information.

11. The positioning device of claim 9, wherein the at least one processor is further configured to perform any one of the following scenarios:
- determine a system frame number and a slot number for transmitting positioning related information based on an acquired first preset Universal Time Coordinated (UTC) reference time point, and control the transmitter for transmitting the positioning related information on a first slot position determined by the system frame number and the slot number;
- determine the system frame number and the slot number for transmitting the positioning related information based on a received timing information of a base station or the base station type RSU or the UE type RSU, and control the transmitter for transmitting the positioning related information on a second slot position determined by the system frame number and the slot number;
- determine a starting point of the slot for transmitting the positioning related information based on at least one of the following items, and control the transmitter for transmitting the positioning related information on a third time slot position determined by the starting point of the slot:
  - the received timing information of the base station;
  - the received timing information of the base station type RSU;
  - the received timing information of the UE type RSU; and
  - a timing advance of the auxiliary positioning information.

12. The positioning device of claim 11, wherein the at least one processor is further configured to:
- determine the system frame number and the slot number of a first positioning reference signal included in the positioning related information based on the first preset UTC reference time point, when the system frame number and the slot number for transmitting positioning related information is determined based on the acquired first preset UTC reference time point of UTC; and
- determine the system frame number and the slot number of a data message included in the positioning related information, based on the received timing information of the base station or the base station type RSU or the UE type RSU, when the system frame number and the slot number for transmitting positioning related information is determined based on the received timing information of the base station or the base station type RSU or the UE type RSU.

13. A positioning device, comprising:
a receiver; and
at least one processor, wherein the receiver is configured for a target UE to receive positioning related information associated with an auxiliary positioning entity from the auxiliary positioning entity, wherein the at least one processor is configured to determine a location information corresponding to the target UE based on the positioning related information associated with the auxiliary positioning entity, and wherein the positioning related information comprising any one of auxiliary positioning information, or location calculation information fed back for positioning request information transmitted by the target UE, and wherein, when the positioning related information comprises the auxiliary positioning information transmitted by the auxiliary positioning entity, the at least one processor is configured to:
- determine an Observed Time Difference of Arrival (OTDOA) according to the time of receiving first positioning reference signals respectively transmitted by a plurality of auxiliary positioning entities; and
- determine the location information corresponding to the target UE according to the OTDOA and geo-location information of the plurality of auxiliary positioning entities.

14. The positioning device of claim 13,
wherein, the auxiliary positioning entity comprises any one of the following:
- a base station, a UE, a base station type Road Side Unit (RSU) and a UE type RSU, and wherein the auxiliary positioning information comprises at least one of the following:
- a first positioning reference signal, geo-location information of the auxiliary positioning entity, and timing information of the first positioning reference signal transmitted by the auxiliary positioning entity.

15. The positioning device of claim 10, wherein the at least one processor is further configured to perform any one of the following scenarios:
- determine a system frame number and a slot number for transmitting positioning related information based on an acquired first preset Universal Time Coordinated (UTC) reference time point, and control the transmitter for transmitting the positioning related information on a first slot position determined by the system frame number and the slot number;
- determine the system frame number and the slot number for transmitting the positioning related information based on the received timing information of a base station or the base station type RSU or the UE type RSU, and control the transmitter for transmitting the positioning related information on a second slot position determined by the system frame number and the slot number;
- determine a starting point of the slot for transmitting the positioning related information based on at least one of the following items, and control the transmitter for transmitting the positioning related information on a third time slot position determined by the starting point of the slot:
  - the received timing information of the base station;
  - the received timing information of the base station type RSU;
  - the received timing information of the UE type RSU; and
  - a timing advance of the auxiliary positioning information.

* * * * *